United States Patent
Fujikawa

(10) Patent No.: US 11,627,292 B2
(45) Date of Patent: Apr. 11, 2023

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 15 days.

(21) Appl. No.: 17/325,910

(22) Filed: May 20, 2021

(65) Prior Publication Data
US 2021/0368143 A1    Nov. 25, 2021

(30) Foreign Application Priority Data

May 21, 2020    (JP) .............................. JP2020-088713

(51) Int. Cl.
*H04N 9/31*    (2006.01)
*G02F 1/1333*    (2006.01)

(52) U.S. Cl.
CPC ..... *H04N 9/3144* (2013.01); *G02F 1/133385* (2013.01)

(58) Field of Classification Search
None
See application file for complete search history.

(56) References Cited

U.S. PATENT DOCUMENTS

| | | |
|---|---|---|
| 2004/0201564 A1 | 10/2004 | Sugino et al. |
| 2005/0179854 A1 | 8/2005 | Sekine et al. |
| 2014/0354185 A1 | 12/2014 | Yoshida |
| 2018/0224692 A1* | 8/2018 | Miyashita ........... G02F 1/13452 |

FOREIGN PATENT DOCUMENTS

| | | |
|---|---|---|
| JP | H10-333123 A | 12/1998 |
| JP | H11-38391 A | 2/1999 |
| JP | 2000-89197 A | 3/2000 |
| JP | 2004-252231 A | 9/2004 |
| JP | 2005-234104 A | 9/2005 |
| JP | 2006-126627 A | 5/2006 |
| JP | 2006-162909 A | 6/2006 |
| JP | 2007-233403 A | 9/2007 |
| JP | 2013-108801 A | 6/2013 |
| JP | 2015-90397 A | 5/2015 |

* cited by examiner

*Primary Examiner* — Richard H Kim
(74) *Attorney, Agent, or Firm* — Oliff PLC

(57) ABSTRACT

Provided is an electro-optical device including an electro-optical panel that includes a display region, a holder that holds the electro-optical panel, a first temperature detecting element that is disposed on the electro-optical panel and detects the temperature of the electro-optical panel, and a second temperature detecting element that is disposed on the holder and detects the temperature of the holder. When four quadrants are defined by an X axis line passing through a center of the display region and a Y axis line passing through the center of the display region and orthogonal to the X axis line, the first temperature detecting element and the second temperature detecting element are disposed in the same quadrant.

9 Claims, 23 Drawing Sheets

ELECTRO-OPTICAL DEVICE AND ELECTRONIC APPARATUS

The present application is based on, and claims priority from JP Application Serial Number 2020-088713, filed May 21, 2020, the disclosure of which is hereby incorporated by reference herein in its entirety.

BACKGROUND

1. Technical Field

The present disclosure relates to an electro-optical device and an electronic apparatus.

2. Related Art

Examples of an electro-optical device include an active drive type liquid crystal device including a switching element for each of pixels. Such a liquid crystal device is used, for example, as a light valve of a projector that is an electronic apparatus.

Since a response rate of liquid crystals is temperature dependent, in such a liquid crystal device, a technique is conceivable in which the temperature of a display region is estimated for driving the liquid crystals at high speed, and a drive signal of the liquid crystals is controlled in accordance with the estimated temperature. For example, in JP-A-2000-89197, a technique is disclosed for estimating the temperature of the display region of the liquid crystal device using a temperature sensor disposed on a non-display region of the liquid crystal device and a temperature sensor disposed on a housing of the liquid crystal device and measuring an ambient temperature around the liquid crystal device.

However, in the liquid crystal device described in JP-A-2000-89197, since a heat flow in an in-plane direction of the liquid crystal device is not considered, it is difficult to accurately estimate the temperature of the display region when there is the heat flow in the in-plane direction, as in the light valve of the projector. Specifically, it is difficult to estimate the temperature of the display region with a high degree of accuracy based on the ambient temperature and the temperature of one point in the non-display region of the liquid crystal device. In particular, temperature estimation is difficult in the vicinity of a display central portion that is separated from the non-display region and has the highest temperature. In other words, there is a demand for a technique for estimating the temperature in the central portion of the display region with a high degree of accuracy.

SUMMARY

According to an aspect of the present disclosure, an electro-optical device includes an electro-optical panel including a display region, a holder configured to hold the electro-optical panel, a first temperature detecting element disposed at the electro-optical panel, and a second temperature detecting element disposed at the holder. When four quadrants are defined by an X axis line passing through a center of the display region and a Y axis line passing through the center of the display region and orthogonal to the X axis line, the first temperature detecting element and the second temperature detecting element are disposed at the same quadrant.

According to an aspect of the present disclosure, an electro-optical device includes an electro-optical panel, a holder configured to hold the electro-optical panel, a first temperature detecting element configured to detect a temperature of the electro-optical panel, and a second temperature detecting element configured to detect a temperature of the holder. The first temperature detecting element is disposed at the electro-optical panel, the second temperature detecting element is disposed at the holder, and the first temperature detecting element and the second temperature detecting element are disposed to cause a coefficient K to be no more than 3 in a following expression, when a temperature of a central portion of a display region of the electro-optical panel is $T(X2)$, a temperature of the first temperature detecting element is $T(X1)$, a temperature of the second temperature detecting element is Th, and the coefficient is K. $T(X2)=K(T(X1)-Th)+Th$.

An electronic apparatus includes the electro-optical device described above.

DESCRIPTION OF EXEMPLARY EMBODIMENTS

First Embodiment

Figure 1:
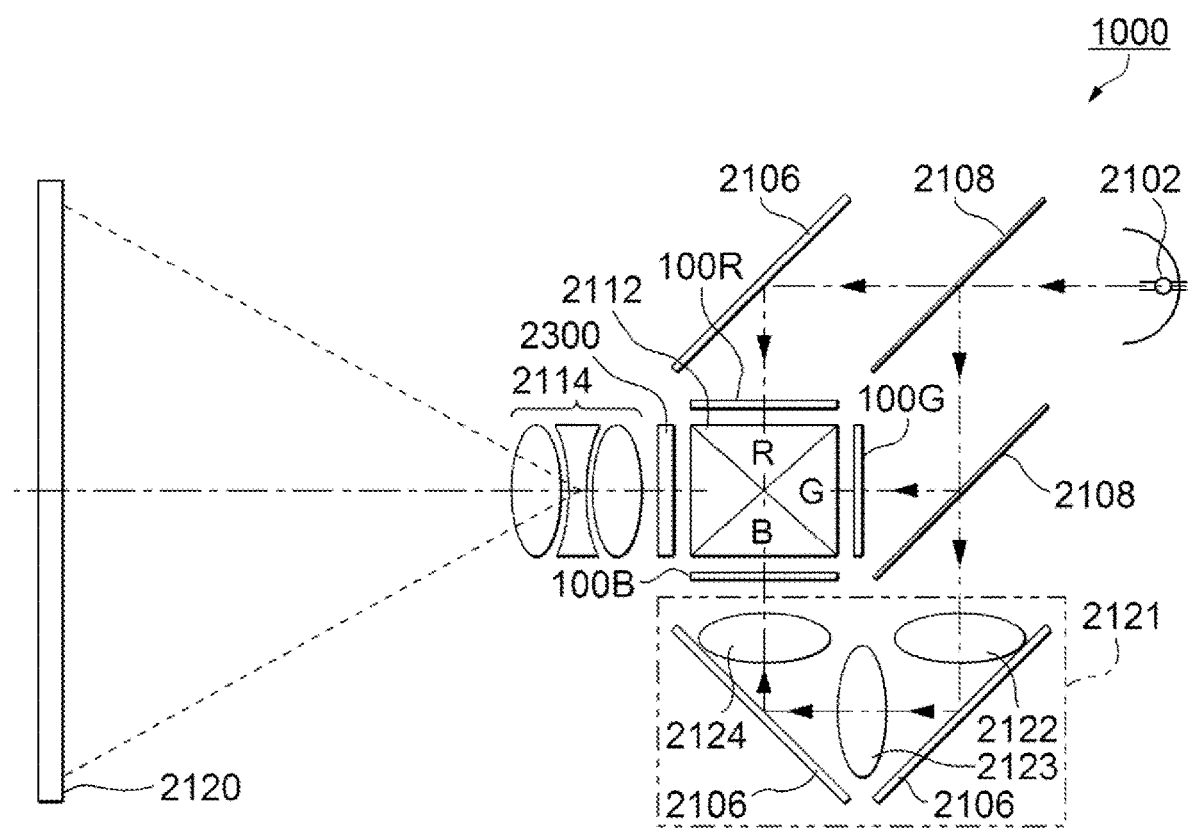
FIG. 1 is a schematic diagram illustrating a configuration of a projector that is an electronic apparatus.

As illustrated in FIG. 1, a projector 1000 includes, as electro-optical panels, a liquid crystal panel 100R, a liquid crystal panel 100G, and a liquid crystal panel 100B. Further, a lamp unit 2102 including a white light source such as a halogen lamp is provided in the projector 1000. Projection light emitted from this lamp unit 2102 is split into three primary colors of red (R), green (G), and blue (B) by three mirrors 2106 and two dichroic mirrors 2108 installed in the interior of the projector 1000. Of the light of the primary colors, the R light is incident on the liquid crystal panel 100R, the G light incident on the liquid crystal panel 100G, and the B light is incident on the liquid crystal panel 100B, respectively.

Note that an optical path of the B light is longer than that of other red light and green light. Thus, in order to prevent loss on the optical path, the B light is guided to the liquid crystal panel 100B via a relay lens system 2121 formed of an incidence lens 2122, a relay lens 2123, and an emission lens 2124.

The liquid crystal panel 100R includes pixel circuits arrayed in a matrix, and, based on a data signal corresponding to R, generates light that passes through a liquid crystal element of the pixel circuit, that is, generates an R transmission image formed by light modulated by the liquid crystal element. Similarly, based on a data signal corresponding to G, the liquid crystal panel 100G generates a G transmission image. Based on a data signal corresponding to B, the liquid crystal panel 100B generates a B transmission image.

The transmission images of each of the colors respectively generated by the liquid crystal panels 100R, 100G, and 100B are incident on a dichroic prism 2112 from three directions. Then, at this dichroic prism 2112, the R light and the B light are refracted at 90 degrees, while the G light travels in a straight line. Thus, after the images of each of the colors have been synthesized, the synthesized image is incident on a projection lens 2114 via a shift device 2300. The shift device 2300 shifts an optical axis of an emission direction from the dichroic prism 2112. The projection lens 2114 enlarges the synthesized image supplied via the shift device 2300, and projects the synthesized image onto a screen 2120. Since the shift device 2300 shifts the optical axis in synchronization with a video frame, a video display is realized with an increased amount of information. In this case, it is necessary to increase the number of video frames. At this time, since a liquid crystal response becomes problematic, temperature management of the liquid crystal panels 100R, 100G, and 100B becomes important in order to suppress an influence of the liquid crystal response.

Note that the transmission images by the liquid crystal panels 100R and 100B are projected after being reflected by the dichroic prism 2112. The transmission image by the liquid crystal panel 100G is projected in a straight line. Thus, each of the transmission images by the liquid crystal panels 100R and 100B has a left-right inverted relationship with respect to the transmission image by the liquid crystal panel 100G.

Figure 2:
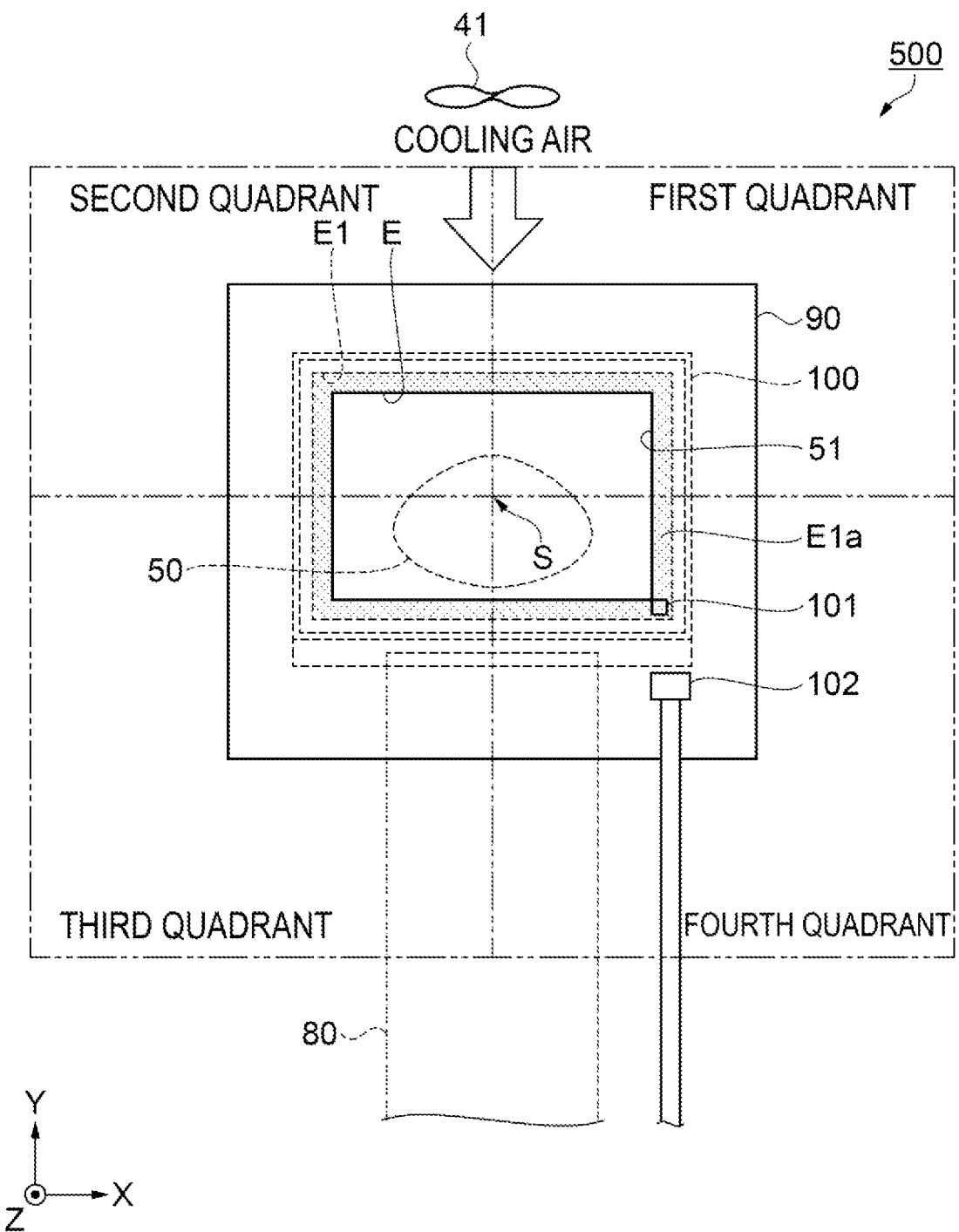
FIG. 2 is a plan view illustrating a configuration of a liquid crystal device that is an electro-optical device.

As illustrated in FIG. 2, a liquid crystal device 500 as an electro-optical device of a first embodiment includes a liquid crystal panel 100, a wiring substrate 80 coupled to a first side of the liquid crystal panel 100, and a holder 90 that holds the liquid crystal panel 100 from both sides in a thickness direction (a Z direction). Note that the holder 90 in the cross-sectional view illustrated in FIG. 3 and the like is omitted as appropriate, where this does not obstruct a description of configurations, operations, and effects of the present disclosure. The liquid crystal panel 100 is used as the light valve of the projector 1000 described above. The wiring substrate 80 is a flexible substrate, such as a flexible printed circuit (FPC) or the like.

The liquid crystal panel 100 includes a display region E that transmits light L (see FIG. 3) and a non-display region E1 that includes a light blocking region E1a that blocks transmission of the light L. A first temperature detecting element 101 that detects the temperature of the liquid crystal panel 100 is disposed in a position overlapping the lower right portion of the non-display region E1 in plan view, specifically, the lower right light blocking region E1a. The first temperature detecting element 101 is, for example, a diode. The diode is formed using the same manufacturing process as pixel circuits and peripheral drive circuits formed on an element substrate 10 configuring the liquid crystal panel 100. Temperature detection by the diode utilizes a temperature dependence of a forward voltage of the diode. The forward voltage of the diode has a negative correlation with the temperature when a constant current value is caused to flow through the diode. Thus, the temperature can be ascertained by measuring the forward voltage. Note that a diode coupled transistor may be used as the element having such temperature characteristics. Alternatively, a temperature detecting device utilizing the temperature dependence of a resistor may be used.

Figure 3:
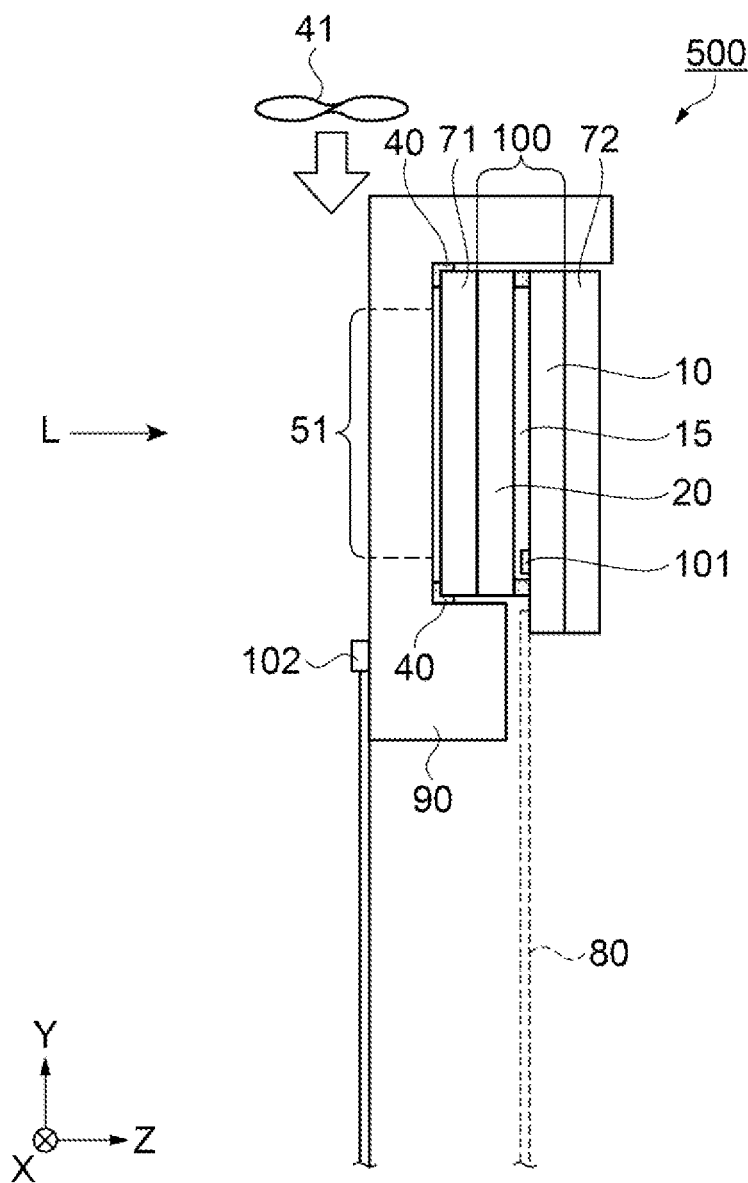
FIG. 3 is a cross-sectional view illustrating the configuration of the liquid crystal device illustrated in FIG. 2.

A second temperature detecting element 102 that detects the temperature of the holder 90 is disposed in a lower right portion of the holder 90. The second temperature detecting element 102 is, for example, a thermistor. Further, as illustrated in FIG. 3, the second temperature detecting element 102 is disposed on a surface of the holder 90 on the opposite side from a side on which the wiring substrate 80 is disposed. Note that the second temperature detecting element 102 may be disposed on the surface of the holder 90 on the wiring substrate 80 side. Further, a mode may also be adopted in which the second temperature detecting element 102 is inserted into a recess (not illustrated) formed in the holder 90. In that case, since the second temperature detecting element 102 is surrounded by the material of the holder 90, it is not likely to be affected by the surrounding ambient temperature, and this becomes a more preferred mode for measuring the temperature of the holder 90. A fourth embodiment described below is one of the modes of the second temperature detecting element 102 inserted into such a recess. Alternatively, a mode may be adopted in which a convex portion protruding from the holder 90 is provided, and the second temperature detecting element 102 is inserted into a recess provided in the convex portion. This convex portion may be integrally formed with the holder 90, or may be a mode in which another component is attached to the holder 90 using a screw or a thermally conductive adhesive. When the convex portion is another component, it is configured by a metal such as aluminum (Al), stainless steel, or the like. In this case also, the convex portion is metal, and thus has the same temperature as the holder 90. In any case, when the second temperature detecting element 102 is surrounded by a material that becomes the temperature of the holder 90, this is preferable since the temperature measurement of the holder 90 is less susceptible to influence by the surrounding ambient temperature.

The first temperature detecting element 101 and the second temperature detecting element 102 are disposed along the same side of the liquid crystal panel 100. Specifically, when four quadrants are defined as a result of being divided by an X axis line passing through the center of the display region E and a Y axis line passing through the center of the display region E and orthogonal to the X axis line, the first temperature detecting element 101 and the second temperature detecting element 102 are disposed in the same quadrant. That is, the first temperature detecting element 101 and the second temperature detecting element 102 are disposed in a fourth quadrant. However, the quadrants referred to herein are not strict mathematical definitions, and for example, the vicinity of the X axis and the vicinity of the Y axis are included in quadrants adjacent to the X axis and the Y axis. Furthermore, the X axis and the Y axis are set in directions of the sides of the rectangular liquid crystal panel 100, but need not necessarily be strictly parallel with the directions of the sides.

A cooling fan 41 for cooling the liquid crystal device 500 is disposed on an upper side of the liquid crystal device 500 in plan view, that is, on the opposite side from the side at which the wiring substrate 80 is attached to the liquid crystal panel 100. In other words, cooling air as a refrigerant from the cooling fan 41 is blown from the upper side to the lower side of the liquid crystal device 500. The arrangement of the cooling fan 41 is not limited to this example, and a mode may be adopted, for example, in which the cooling air as the refrigerant from the cooling fan 41 is blown from the upper side to the lower side of the liquid crystal device 500 via a pipe shaped air duct. Thus, an isotherm 50 in the display region E of the liquid crystal panel 100 tends to be slightly higher below a central portion S of the display region E.

As illustrated in FIG. 3, the liquid crystal device 500 includes the liquid crystal panel 100 and the holder 90 that holds the liquid crystal panel 100. The liquid crystal panel 100 includes the element substrate 10 on which transistors, wiring, and the like are formed, a counter substrate 20 disposed facing the element substrate 10, and a liquid crystal layer 15 disposed between the element substrate 10 and the counter substrate 20. The liquid crystal device 500 has a configuration in which the light L is incident from the counter substrate 20 side, for example.

A first dust resistant substrate 71 is disposed on the counter substrate 20. A second dust resistant substrate 72 is disposed on the element substrate 10. The liquid crystal panel 100 is fixed to the holder 90 using a thermally conductive adhesive 40, via the first dust resistant substrate 71. Accordingly, when the liquid crystal panel 100 generates heat as a result of the incident light, a heat flow in an in-plane direction is generated via a metal wiring layer and the like of the element substrate 10. The heat flow reaches the holder 90 via the counter substrate 20, the first dust resistant substrate 71, and the thermally conductive adhesive 40. Since there is the heat flow in the in-plane direction, a temperature distribution is generated in the liquid crystal panel 100. A portion of the amount of heat is discharged to the surrounding environment via a path through the counter substrate 20 and the first dust resistant substrate 71, and a path through the element substrate 10 and the second dust resistant substrate 72. An opening 51 through which the light L passes is formed in the holder 90 at a position overlapping the display region E (see FIG. 2) of the liquid crystal panel 100. Note that a contour line of the opening 51 actually overlaps the light blocking region E1a described with reference to FIG. 2, and is positioned slightly outside of a contour line of the light blocking region E1a on the display area E side. In an example, in order to make a distinction in the drawings easy, the contour line of the opening 51 and the contour line of the light blocking region E1a on the display area E side are illustrated in the same position.

Figure 4:
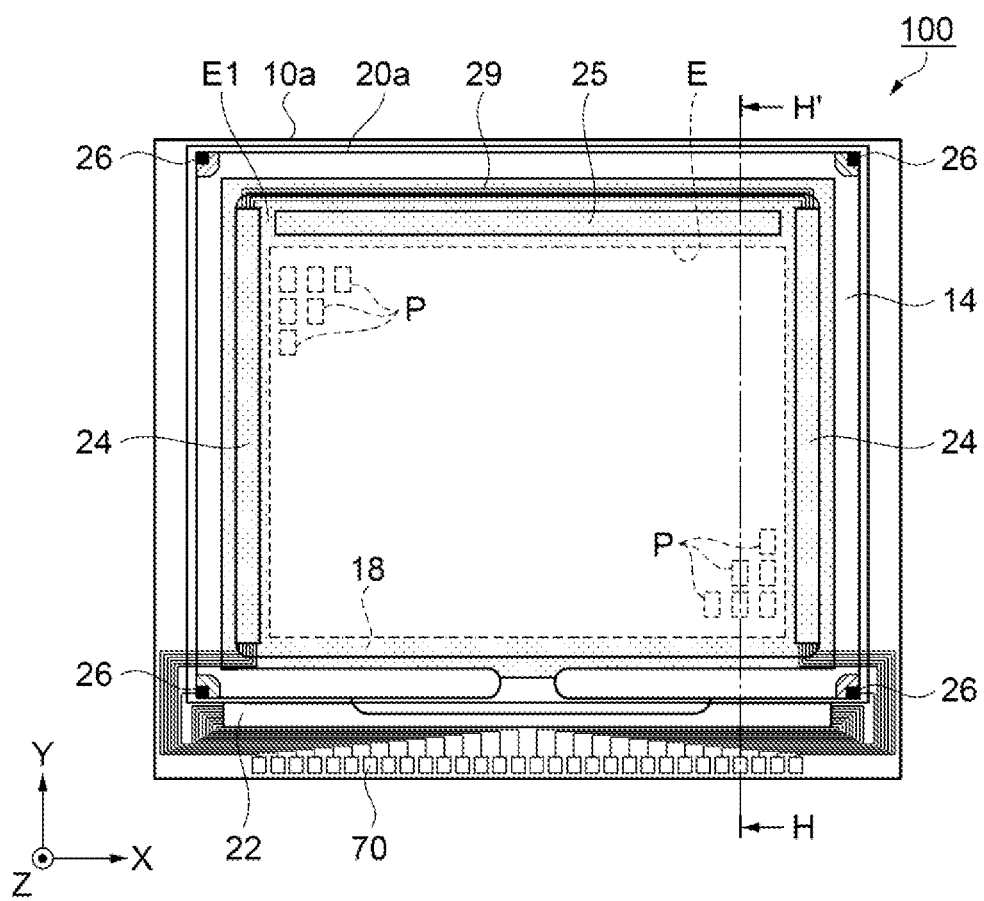
FIG. 4 is a plan view illustrating a configuration of a liquid crystal panel.
Figure 5:
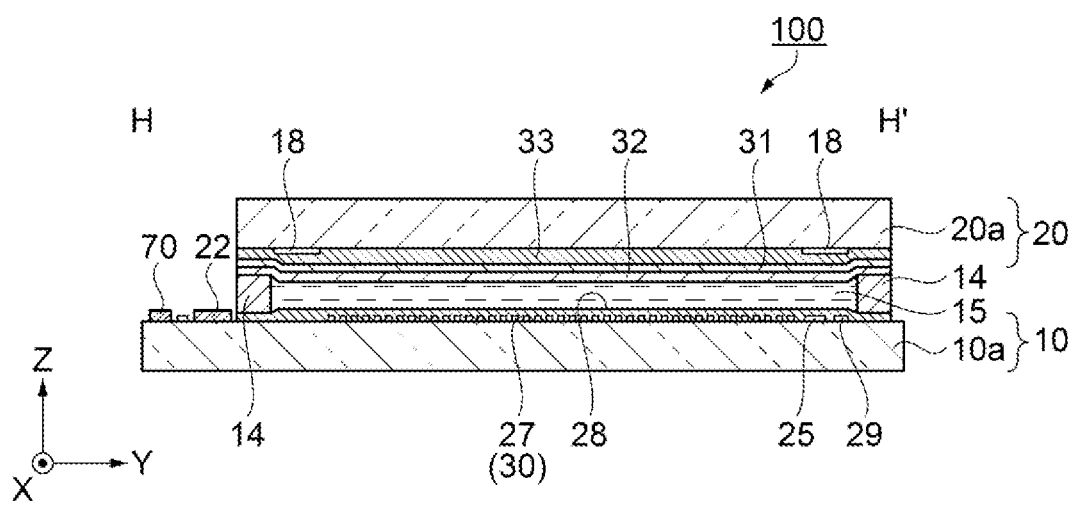
FIG. 5 is a cross-sectional view along a line H-H' of the liquid crystal panel illustrated in FIG. 4.

As illustrated in FIG. 4 and FIG. 5, the liquid crystal device 100 includes the element substrate 10 and the counter substrate 20 disposed facing each other, and the liquid crystal layer 15 interposed between this pair of substrates. A first substrate 10a as a substrate configuring the element substrate 10 and a second substrate 20a configuring the counter substrate 20 are, for example, glass, quartz, or the like.

The element substrate 10 is larger than the counter substrate 20, and both the substrates are bonded together via a seal material 40 disposed along an outer periphery of the counter substrate 20. The liquid crystal layer 15 is formed as a result of liquid crystals having positive or negative dielectric anisotropy being injected into a gap between the pair of substrates.

As the seal material 40, for example, an adhesive such as a thermosetting or ultraviolet curable epoxy resin is employed. The seal material 40 is mixed with a spacer configured to keep an interval between the pair of substrates constant.

The display region E in which are disposed a plurality of pixels P contributing to display is provided on an inner side of the seal material 14. The non-display region E1 provided with peripheral circuits or the like that do not contribute to display is disposed around the display region E.

A data line drive circuit 22 is provided between the first side of the element substrate 10 and the seal material 14 along the first side. Further, an inspection circuit 25 is provided between the display region E and the seal material 14 along another first side facing the first side. Furthermore, scanning line drive circuits 24 are provided between the display region E and the seal material 14 along second sides facing each other and orthogonal to the first side. A plurality of wiring lines 29 coupling the two scanning line drive circuits 24 are provided between the inspection circuit 25 and the seal material 14 along the other first side facing the first side.

On the inner side of the seal material 14 disposed in a frame shape on the counter substrate 20 side, a light blocking film 18 is similarly formed in a frame shape. The light blocking film 18 is formed for example, from a metal or a metal oxide having light shielding properties, a region in which the light blocking film 18 is provided corresponds to the light blocking region E1a, and the display region E including the plurality of pixels P is on the inner side of the light blocking film 18. For example, tungsten silicide (WSi) or chromium (Cr) can be used as the light blocking film 18.

Wiring lines coupled to the data line drive circuit 22 and the scanning line drive circuits 24 are coupled to a plurality of external connection terminals 70 disposed along the first side. Hereinafter, a direction along the first side is described as an X direction, and a direction along the second sides orthogonal to the first side and facing each other is described as a Y direction. Further, viewing from the Z direction is referred to as plan view.

FIG. 5 illustrates a cross-sectional view along a line H-H' illustrated in FIG. 4, in which pixel electrodes 27 having optical transparency and provided for each of the pixels P, thin film transistors that are switching elements (hereinafter, referred to as "transistors 30"), a data line (not illustrated), and a first oriented film 28 covering these components are formed on a surface of the first substrate 10a on the liquid crystal layer 15 side.

The pixel electrode 27 is configured by a transparent conductive film such as indium tin oxide (ITO).

The light blocking film 18, an insulating layer 33 formed covering the light blocking film 18, a counter electrode 31 provided covering the insulating layer 33, and a second oriented film 32 covering the counter electrode 31 are provided on a surface of the counter substrate 20 on the liquid crystal layer 15 side. The counter substrate 20 of the present disclosure includes at least the light blocking film 18, the counter electrode 31, and the second oriented film 32.

As illustrated in FIG. 4 and FIG. 5, the light blocking film 18 surrounds the display region E and is also provided at a position overlapping the scanning line drive circuits 24 and the inspection circuit 25 in plan view. Thus, the light blocking film 18 blocks the light incident on the peripheral circuits including these drive circuits from the counter substrate 20 side, and has a role of preventing malfunction of the peripheral circuits due to the light. Further, the light blocking film 18 blocks the light to prevent unnecessary stray light from being incident on the display region E, and secures a high contrast in the display of the display region E.

The insulating layer 33 is formed by an inorganic material such as a silicon oxide, for example, has optical transparency, and is provided covering the light blocking film 18. Examples of a method for forming this type of the insulating layer 33 include a film formation method using a plasma chemical vapor deposition (CVD) method or the like.

The counter electrode 31 is formed by a transparent conductive film such as indium tin oxide (ITO), and, as well as covering the insulating layer 33, is electrically coupled to the wiring lines on the element substrate 10 side, by upper and lower conduction portions 26 provided in four corners of the counter substrate 20, as illustrated in FIG. 4.

The first oriented film 28 covering the pixel electrodes 27 and the second oriented film 32 covering the counter electrode 31 are selected based on an optical design of the liquid crystal device 100. As the first oriented film 28 and the second oriented film 32, an inorganic oriented film is formed of an inorganic material, such as silicon oxide (SiOx) formed by a vapor-phase growth method, in which liquid crystal molecules having negative dielectric anisotropy are aligned so as to be substantially vertical.

The liquid crystal panel 100 thus configured is a transmissive-type liquid crystal panel, and the optical design employed is a normally white mode in which transmittance of the pixels P when a voltage is not applied is greater than the transmittance when the voltage is applied, or a normally black mode in which the transmittance of the pixel P when the voltage is not applied is smaller than the transmittance when the voltage is applied. Next, an electrical configuration of the projector 1000 will be described with reference to a block diagram illustrated in FIG. 6.

Figure 6:
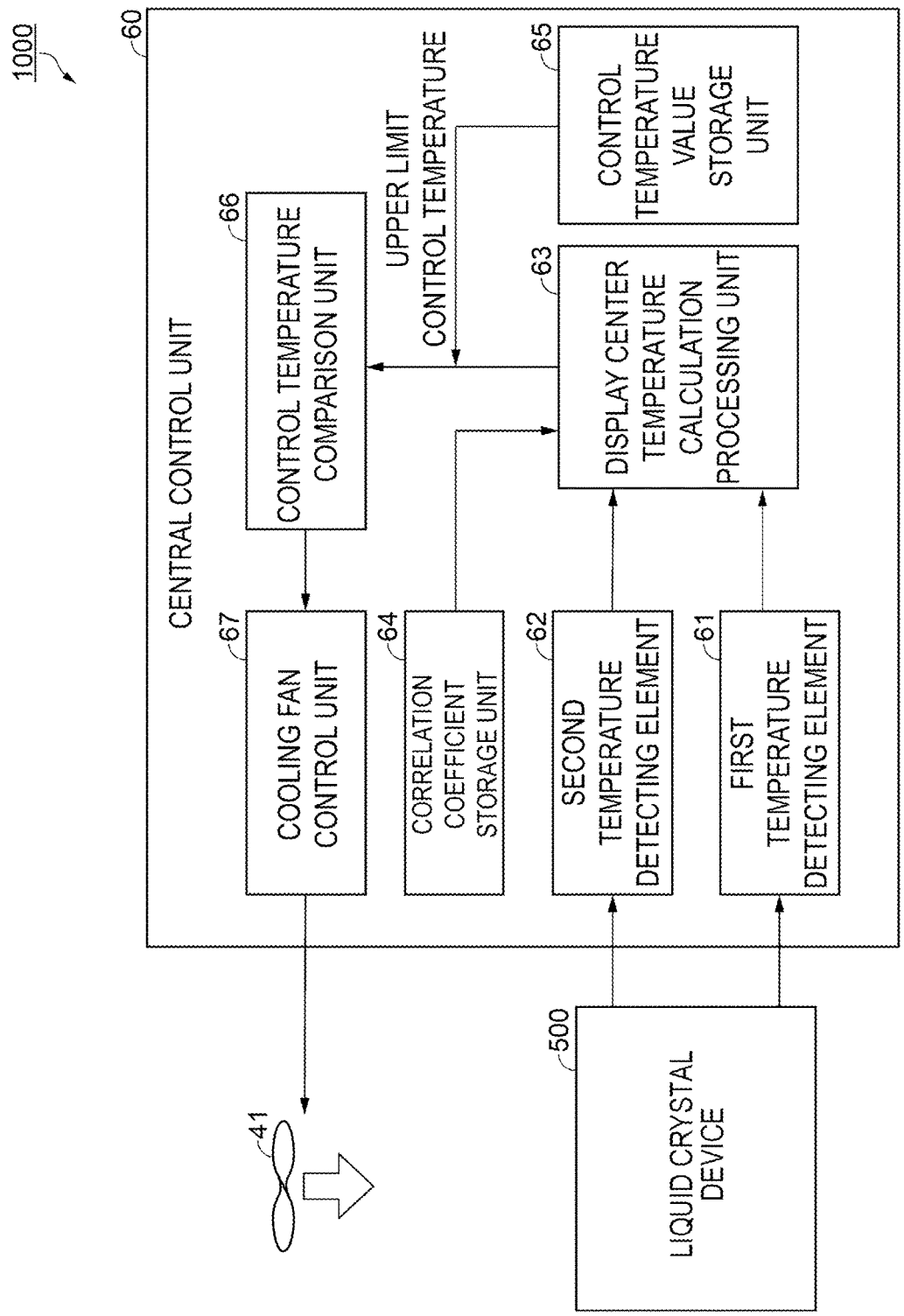
FIG. 6 is a block diagram illustrating an electrical configuration of the projector.

As illustrated in FIG. 6, the projector 1000 is provided with the liquid crystal device 500, a central control unit 60, and the cooling fan 41. As described above, the liquid crystal device 500 includes the liquid crystal panel 100 and the holder 90.

The central control unit 60 is provided with a first temperature detecting element calculation unit 61, a second temperature detecting element calculation unit 62, a display center temperature calculation processing unit 63, a correlation coefficient storage unit 64, a control temperature value storage unit 65, a control temperature comparison unit 66, and a cooling fan control unit 67.

The first temperature detecting element calculation unit 61 calculates a first temperature measurement value from an output value obtained by the first temperature detecting element 101. The second temperature detecting element calculation unit 62 calculates a second temperature measurement value from an output value obtained by the second temperature detecting element 102. In the correlation coefficient storage unit 64, a coefficient K is stored for estimating a temperature of a predetermined region of the display region E. The predetermined region is, for example, near the central portion S of the display region E, and more specifically, is in the vicinity of a region indicating the highest temperature. In the following description, the central portion S of the display region E is treated as being the vicinity of the region indicating the highest temperature.

The display center temperature calculation processing unit 63 estimates a temperature of the display central portion S (see FIG. 2 and FIG. 7) of the display region E of the liquid crystal panel 100, based on the first temperature measurement value, the second temperature measurement value, and the coefficient K. A control temperature value of the display central portion S of the liquid crystal panel 100 is stored in the control temperature value storage unit 65.

The control temperature comparison unit 66 compares the estimated temperature value of the display central portion S calculated by the display center temperature calculation processing unit 63 with the control temperature value. The control temperature comparison unit 66 determines control by the cooling fan control unit 67 so that the display central portion S does not exceed an upper limit of the control temperature value. The cooling fan control unit 67 adjusts an effective drive voltage using pulse width modulation (PMW), for example, and controls an air flow rate of the cooling fan 41. In other words, the temperature of the liquid crystal panel 100 that generates heat is cooled to an appropriate temperature.

Next, it will be verified whether or not, in the liquid crystal device 500 of the first embodiment, the temperature of the display central portion S of the liquid crystal panel 100 is estimated in a highly accurate manner.

Here, micro regions are set in the vicinity of the liquid crystal layer 15 (see FIG. 3 and FIG. 5) of the liquid crystal panel 100. Then, a one-dimensional thermal circuit with the heat flow from the display central portion S to the holder 90 is considered. This is the same as following the path from the display central portion S toward the holder 90 that is orthogonal to the isotherm 50. Since the path orthogonal to the isotherm 50 is considered, a heat flow in the orthogonal direction of the path, that is, in the direction of the isotherm, can be almost completely ignored, and thus, a one-dimensional thermal circuit can be considered. A path from the vicinity of the display central portion S toward a long side of the display region E, for example, is easily considered as the path orthogonal to the isotherm 50. A path from the vicinity of the display central portion S toward the short side of the display region E, a path from the vicinity of the display central portion S toward a corner portion of the display region E and the like can also be assumed. Further, this path need not necessarily be linear, and may be a curved line as long as the distribution of the isotherm 50 does not change significantly. Coordinates used in the following description are on such a path.

Assuming that a thermal resistance from the edge of the display region E to a thermal contact point of the holder 90 and the first dust resistant substrate 71 is R0, the temperature of the holder 90 is Th, and the heat flow to the holder 90 at a coordinate x=Xp is Q(Xp), the following Expression (1) can be derived. Here, a coordinate x=0 indicates the thermal contact point of the holder 90 and the first dust resistant substrate 71. Thus, the thermal resistance R0 is determined by the thickness of the first dust resistant substrate 71 and the counter substrate 20, a distance from an end of the first dust resistant substrate 71 to the end portion of the display region E in plan view, physical property values of each of the substrates, and the like. Further, since the coordinate x=Xp indicates an end of the incidence region of the light on the liquid crystal panel 100, the coordinate x=Xp is near an end portion of the opening 51 of the holder 90, outside the display region E. Here, the light blocking region E1a is also present.

For coordinates to which 0≤x≤Xp applies, since the light incident on the liquid crystal panel 100 is blocked, a new heat source is not present, and thus a heat flow Q(x) is considered to be the same regardless of the coordinates. Expression (1) can now be described using the temperature of x=0, that is, the temperature Th of the holder 90, the thermal resistance R0, and the heat flow Q(Xp) of the coordinates x=Xp.

[Expression 1]

$$T(x=Xp)=Th+R0\cdot Q(Xp) \qquad (1)$$

Furthermore, in a region of coordinates to which Xp≤x applies, when the temperature at a given coordinate x is T(x), the heat flow to the holder 90 at the given coordinate x is Q(x), the ambient temperature on the first dust resistant substrate 71 side is T0f, the ambient temperature on the second dust resistant substrate 72 side is T0r, a heat transfer rate in the thickness direction of the substrates is h, a thermal resistance per unit length in the X direction is R, an area of a micro region is A, and a heat generation flow due to the incident light in the micro region (constant regardless of the coordinates) is J, it is not necessary to take heat capacity into account in the thermal equilibrium state, and thus, the following Expressions (2) and (3) can be described. A differential equation relating to the temperature T(x) is obtained from Expression (2) and Expression (3). Then, the differential equation can be solved to derive Expression (4). The reason that the heat generation flow J due to the incident light is considered to be constant regardless of the coordinates is that light from the lamp unit 2102 illustrated in FIG. 1 is incident on the display region E with a substantially uniform distribution using a lens array or the like (not illustrated). Expression (3) describes that an amount of change of the heat flow Q(x) in the micro region is obtained by subtracting heat dissipation to the external environment via the first dust resistant substrate 71, and heat dissipation to the external environment via the second dust resistant substrate 72 side from the heat generation flow J due to the incident light. In other words, in the micro region, the heat that cannot be directly dissipated to the external environment is an amount of increase of the heat flow toward the coordinate x=0.

[Expression 2]

$$\frac{dT(x)}{Rdx}=Q(x) \qquad (2)$$

[Expression 3]

$$\frac{dQ(x)}{dx}=-(J-Ah(T(x)-T0f)-Ah(T(x)-T0r)) \qquad (3)$$

[Expression 4]

$$Tx=\left(Th+R0\cdot Q(Xp)-\left(\frac{1}{2}(T0f+T0r)+\frac{J}{2Ah}\right)\right) \qquad (4)$$

$$\exp(-\sqrt{2AhR}(x-Xp))+\left(\frac{1}{2}(T0f+T0r)+\frac{J}{2Ah}\right)$$

$$=\left(\left(\frac{1}{2}(T0f+T0r)+\frac{J}{2Ah}\right)-Th-R0\cdot Q(Xp)\right)$$

$$(1-\exp(-\sqrt{2AhR}(x-Xp)))+Th+R0\cdot Q(Xp)$$

Using the fact that the heat flow in Expression (4), Expression (2), and the coordinate x=Xp is Q(Xp), Q (Xp) can be removed. Furthermore, the following Expression (5) can be obtained using given coordinates X1 and X2. In the process of deriving Expression (5), the ambient temperatures T0f and T0r, and the heat generation flow J due to the incident light can be removed.

[Expression 5]

$$T(X2)=K(T(X1)-Th)+Th \qquad (5)$$

Here, K is described as follows: In other words, K is a constant determined by design values relating to the thickness, distances and the like of each of the substrates, physical property values, the coordinates, and the like.

[Expression 6]

$$K=\frac{\frac{R0}{R}\cdot\sqrt{2AhR}+1-\exp(-\sqrt{2AhR}(X2-Xp))}{\frac{R0}{R}\cdot\sqrt{2AhR}+1-\exp(-\sqrt{2AhR}(X1-Xp))} \qquad (6)$$

Figure 7:
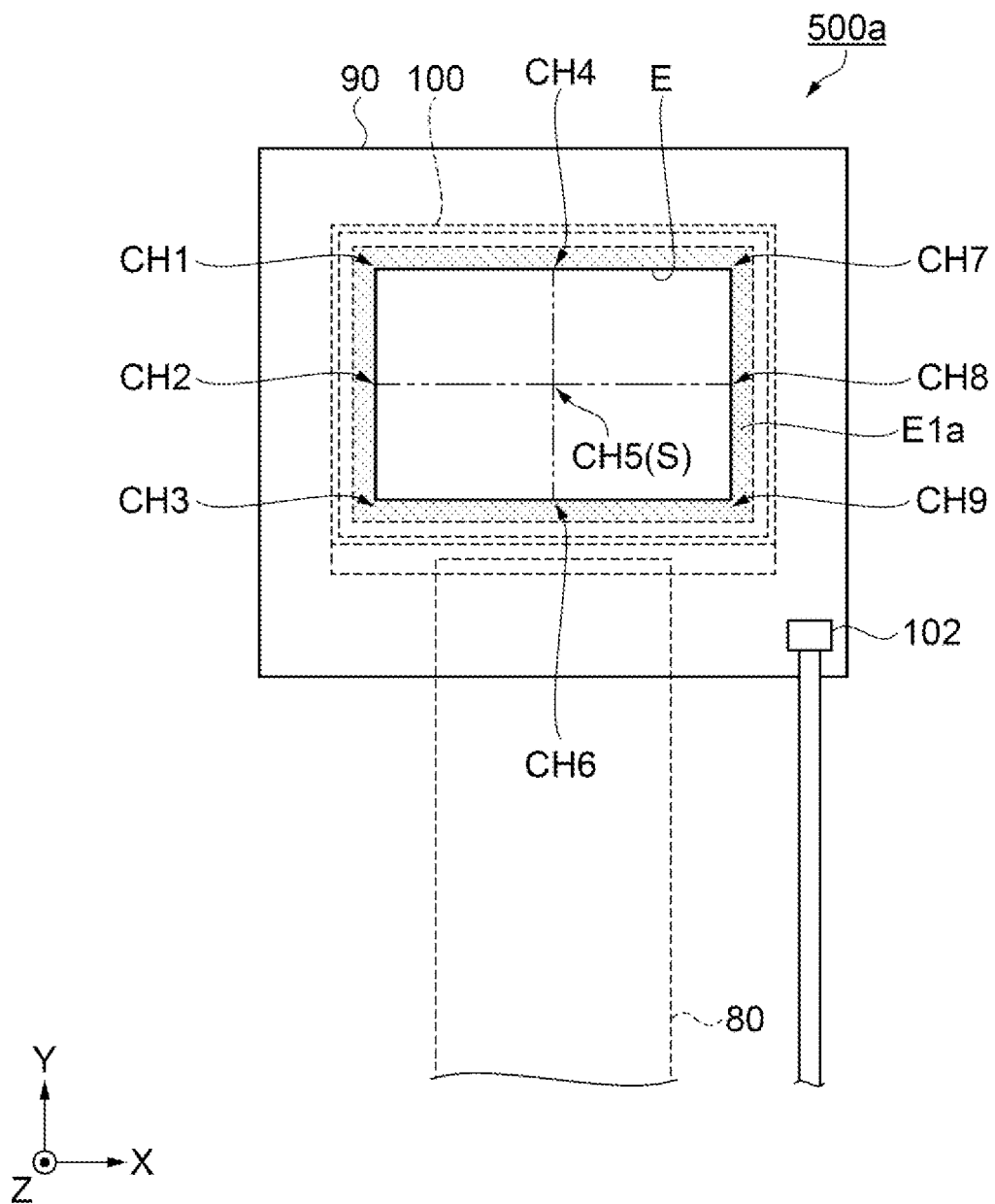
FIG. 7 is a plan view illustrating a configuration of a liquid crystal device of a verification test.

Next, as illustrated in FIG. 7, a verification test is performed using a verification liquid crystal device 500a, to verify whether or not the temperature of the display central portion S can be calculated using Expression (5). The ambient temperatures T0f and T0r around the display region E of the liquid crystal panel 100 are physical quantities that are difficult to accurately measure in real time in the liquid crystal panel 100 of the projector 1000. From Expression (5), the fact that the ambient temperatures have been removed means that Expression (5) can be established irrespective of a cooling setting. Further, the fact that the heat generation flow J due to the incident light is removed means that Expression (5) can be established irrespective of an incident light amount of the liquid crystal panel 100 of the projector 1000. Thus, as long as the extremely simple Expression (5) is established, there is no need at all for a complex cooling control look-up table or the like configured in accordance with the cooling setting or a projection brightness of the projector 1000.

As illustrated in FIG. 7, the verification liquid crystal device 500a monitors the temperature of each of components as a result of arranging the first temperature detecting elements 101 in the four corners of the display region E, in a central portion of each of the sides, and in the display central portion S. These first temperature detecting elements 101 are nine first temperature detecting elements CH1, CH2, CH3, CH4, CH5, CH6, CH7, CH8, and CH9. Further, the verification liquid crystal device 500a monitors the temperature of the holder 90 as a result of arranging the second temperature detecting element 102 on the lower right portion of the holder 90 illustrated in FIG. 7.

The first temperature detecting element 101 is, for example, a diode. The second temperature detecting element 102 is, for example, a thermocouple. Further, in the liquid crystal panel 100 for verification, various wiring patterns are formed in the display region E to simulate the actual liquid crystal panel 100. Thus, when the light L is incident, the heat is generated in the same manner as in the actual liquid crystal panel 100. Temperature sensitive liquid crystals (a 70° C. setting, for example) were sealed in the liquid crystal panel 100 for verification, and consistency with the detection temperature of the diode was confirmed. The reaction of the temperature sensitive liquid crystals and an error in the detection temperature by the diode were approximately ±1° C. or less. The temperatures measured by the first temperature detecting elements 101 and the second temperature detecting element 102 were measured simultaneously within approximately ±1 second of delay.

Figure 8:
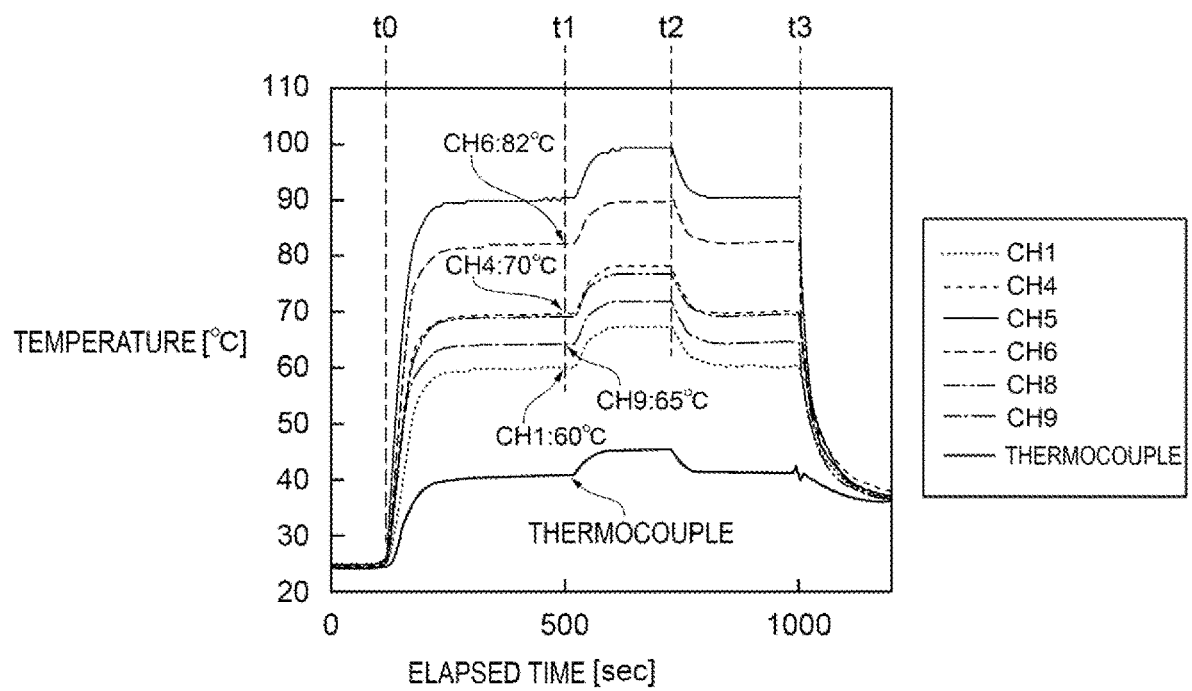
FIG. 8 is a graph showing results of the verification test.

FIG. 8 is a graph in which the verification liquid crystal device 500a is incorporated into the projector 1000, and changes in temperature were measured from illumination to natural cooling after being turned off. The graph shown in FIG. 8 shows the detection temperatures of measurement points, namely, of the first temperature detecting elements CH1, CH4, CH5, CH6, CH8, and CH9, and of the thermocouple that is the second temperature detecting element.

At a time t0, an illumination operation is performed and the cooling fan 41 rotates, and it can be seen that the temperature of the liquid crystal panel 100 increases due to the incidence of the light from the light source, and that the detection temperature of each of the temperature sensors increases.

At a time t1, since an air flow blown from the cooling fan 41 is reduced for the purpose of verification, it can be seen that each of the detection temperatures increases. At a time t2, since the air flow blown from the cooling fan 41 is returned to an original level, it can be seen that each of the detection temperatures falls. At a time t3, an operation to turn off the illumination is performed, the incidence of the light from the light source stops, and the blowing of the air flow from the cooling fan 41 is also stopped. Thus, times from the time t3 onward show natural cooling in the projector 1000.

Note that the temperature measurement is performed at approximately six second intervals. Further, in order to perform evaluation in the projector 1000 for verification and the verification liquid crystal device 500a, the detection temperatures indicate temperatures higher than usage temperatures in an actual product. A temperature characteristic evaluation is performed in advance on the first temperature detecting element 101 using the diode, and a calibration value is calculated and reflected in the temperature detection. The concentration of each of the detection temperatures around 25° C. at the time t0 is also evidence that the room temperature at the start of the test is approximately 25 degrees and that the calibration is appropriate. Each of the detection temperatures at the time t0 is also aligned with the detection temperature of the thermocouple.

For example, the highest temperature at the time t1 is the first temperature detecting element CH5 of the display central portion S. The next highest temperature is the first temperature detecting element CH6 below the display central portion S. In the projector 1000 for verification, the cooling air is blown from an upper portion of the liquid crystal device 500a illustrated in FIG. 7. In other words, due to the direction of the cooling air, the temperature distribution of a display unit tends to be higher below the display central portion S of the liquid crystal panel 100, like the isotherm 50. Note that the temperature of each of the portions at the time t1 in FIG. 8 is rounded to the nearest unit of 1° C.

Figure 9:
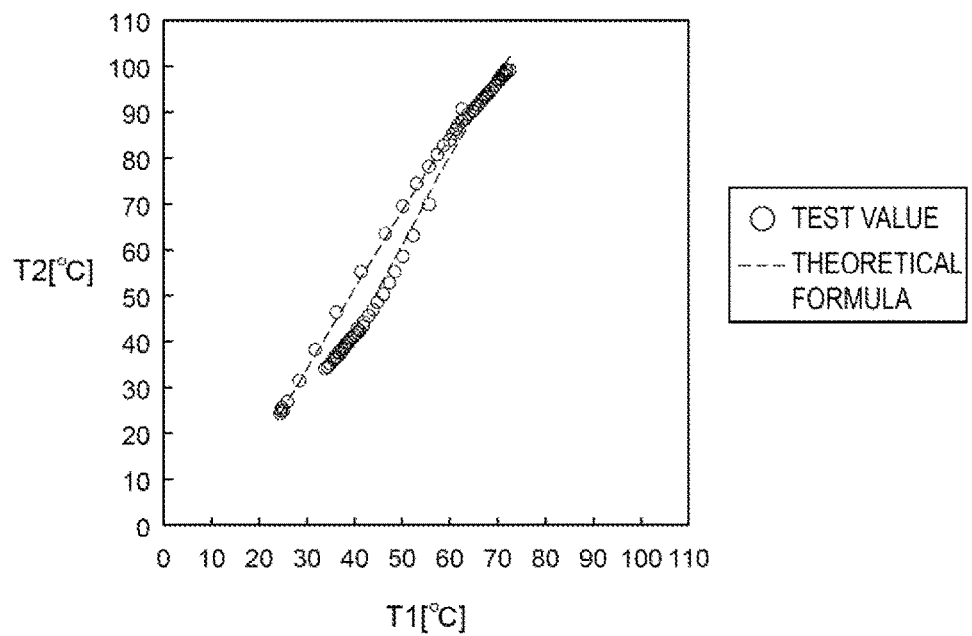
FIG. 9 is a graph showing results of the verification test.

Next, it is verified whether the coefficient K expressed in Expression 5 can be considered to be a constant. FIG. 9 illustrates a temperature correlation diagram from the start of the test to the time t3, when the temperature of the first temperature detecting element CH9 disposed in the lower right portion of the light blocking area E1a is T1 and the temperature of the first temperature detecting element CH5 disposed in the display central portion S is T2.

As illustrated in FIG. 9, two of plot groups are divided into behavior when the cooling fan 41 is operating, and behavior when the cooling fan 41 has stopped after the illumination is turned off. The relationship between temperature T2 and temperature T1 from the start of the test to the time t3 onward is plotted as test values (symbols ○), and a fit between the temperature T1, the temperature Th of the holder 90 by the thermocouple, and a theoretical formula (dashed lines) according to the derived Expression (5) is tested. The value of the coefficient K was assumed to be 2.1 in the visual fit.

Although the test includes a temperature transition that is not in the thermal equilibrium state, from results of the fit, it can be said that the theoretical formula according to Expression (5) is considered to have sufficient reproducibility in practical use. Further, the results are notably reproduced in the period up to the natural cooling process after the cooling fan 41 has stopped. That is, it can be determined that the display central portion S for which the temperature is to be estimated, and the first temperature detecting element 101 and the second temperature detecting element 102 are under the influence of the same heat flow. In other words, it is indicated that, when the first temperature detecting element 101 and the second temperature detecting element 102 are disposed in a substantially straight line, the temperature of the display central portion S can be estimated with a high degree of accuracy. Although the heat generation of the liquid crystal panel 100 changes due to the incidence of the light, and the ambient temperature around the liquid crystal panel 100 changes depending on the operation of the cooling fan 41, the results of the test can be reproduced using the theoretical formula according to Expression (5). In other words, the validity of Expression (5) is demonstrated.

Figure 10:
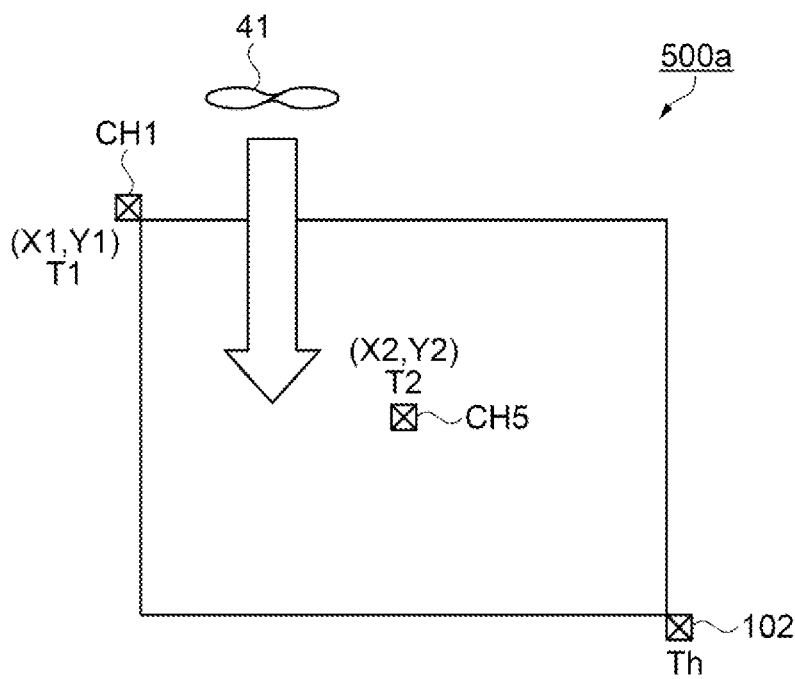
FIG. 10 is a plan view illustrating the liquid crystal device of a verification test.
Figure 11:
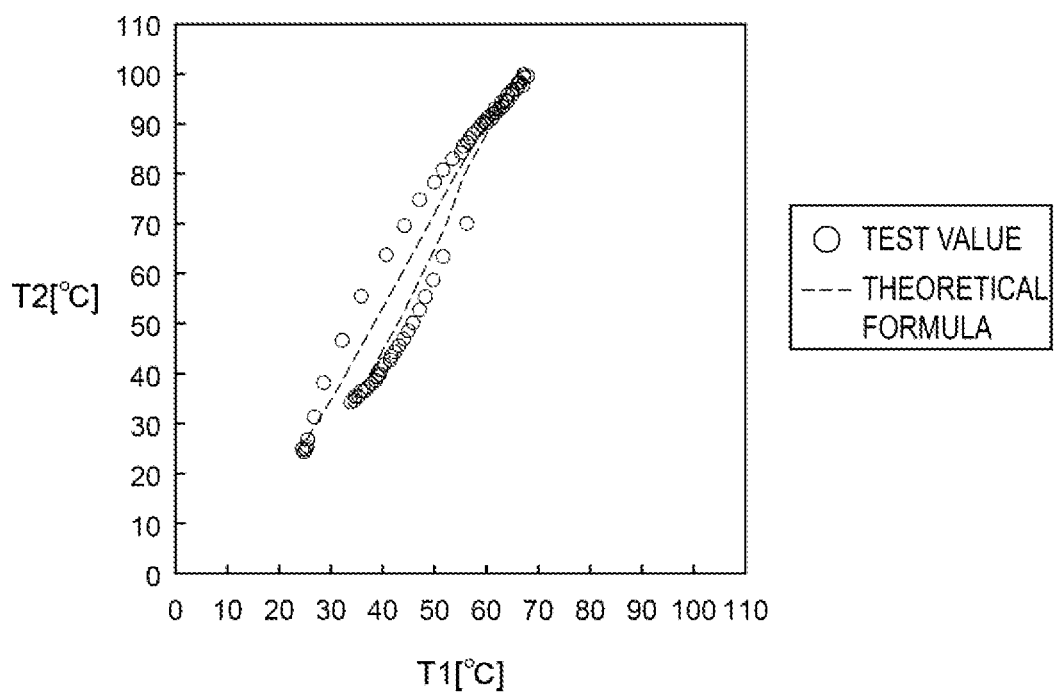
FIG. 11 is a graph showing results of the verification test.
Figure 12:
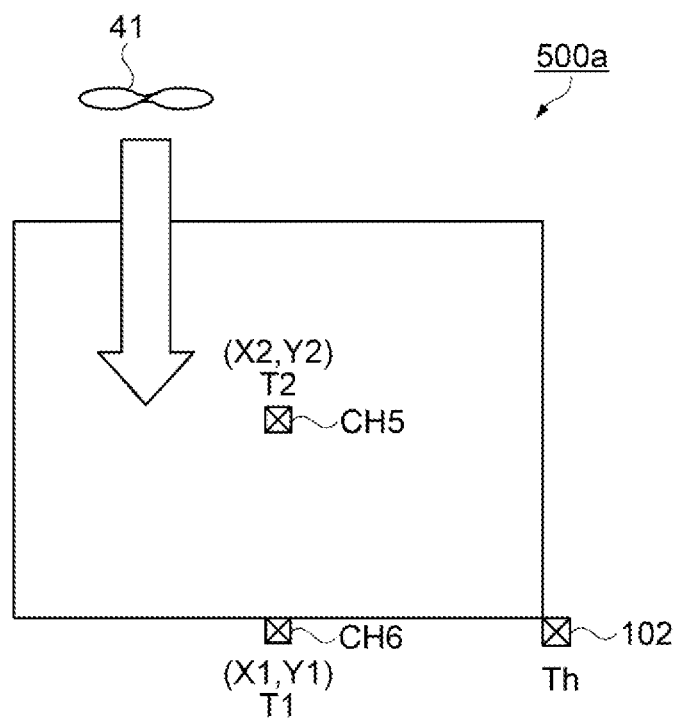
FIG. 12 is a plan view illustrating the liquid crystal device of the verification test.
Figure 13:
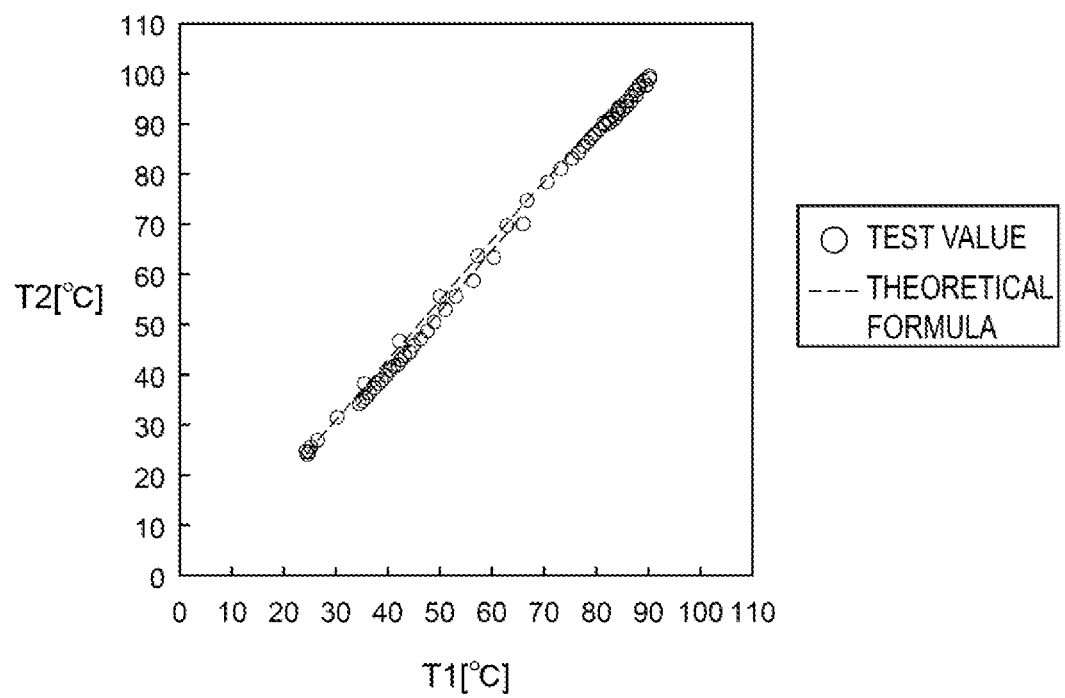
FIG. 13 is a graph showing results of the verification test.
Figure 14:
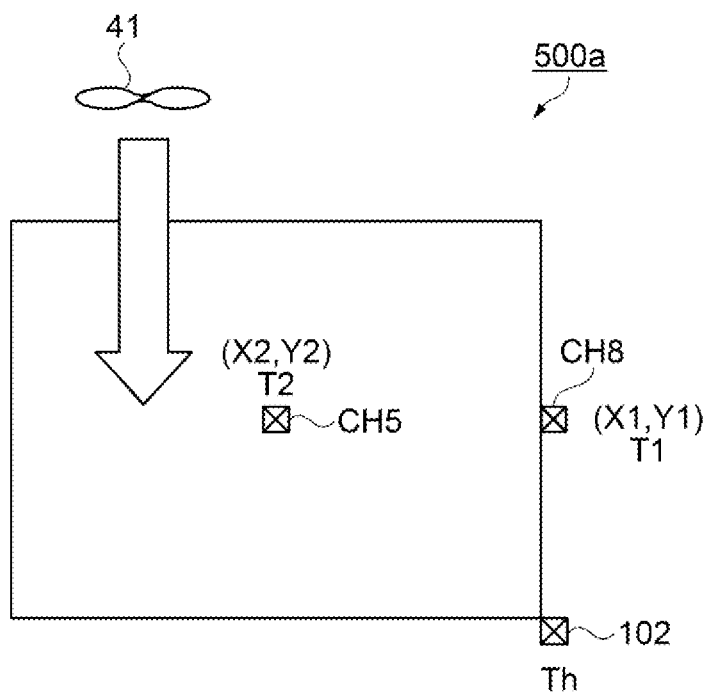
FIG. 14 is a plan view illustrating the liquid crystal device of the verification test.
Figure 15:
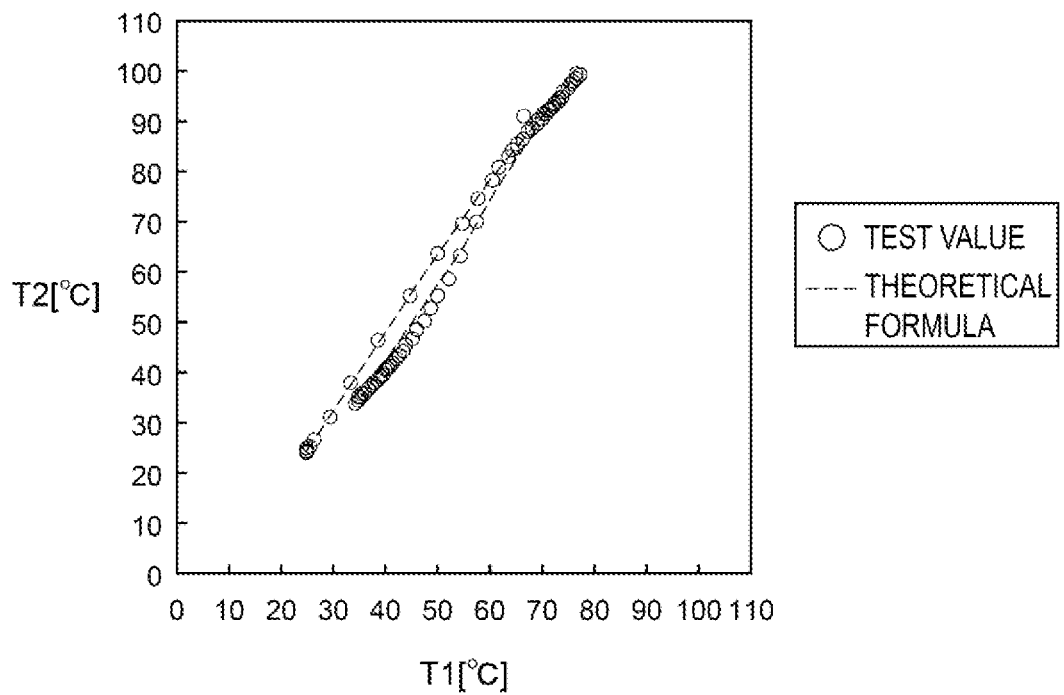
FIG. 15 is a graph showing results of the verification test.

Next, with reference to FIG. 10 to FIG. 15, a relationship between an orientation of the cooling air and a temperature monitoring position will be verified. FIG. 10 and FIG. 11 illustrate examples of poor temperature monitors. FIG. 12 to FIG. 15 illustrate examples of good temperature monitors. FIG. 11, FIG. 13, and FIG. 15 show results of a fit between test values (symbols ○) and a theoretical formula (dashed lines), in a similar manner to FIG. 9.

First, an example of the poor temperature monitor will be described with reference to FIG. 10 and FIG. 11. FIG. 10 is a diagram illustrating a positional relationship of the first temperature detecting element CH1, the first temperature detecting element CH5 of the display central portion S for which the temperature is to be estimated, and the second temperature detecting element 102 disposed on the holder 90, when the liquid crystal device 500a is viewed in plan view. FIG. 11 is a graph showing test values and theoretical values when the horizontal axis is the temperature T1 of the first temperature detecting element CH1 and the vertical axis is the temperature T2 of the first temperature detecting element CH5 of the display central portion S for which the temperature is to be estimated. In FIG. 10, (X1,Y1) indicates the XY coordinates at which the first temperature detecting element CH1 is positioned, and (X2, Y2) indicates the XY coordinates at which the second temperature detecting element CH5 is positioned.

As illustrated in FIG. 11, two of plot groups are divided into behavior when the cooling fan 41 is operating, and behavior when the cooling fan 41 has stopped after the illumination is turned off. In this graph, the theoretical values and the test values are superimposed using the temperature of T1 and the temperature of Th when the coefficient K is 2.5.

As a result, it can be seen that an accuracy of fit between the test values and the theoretical values is poor. Specifically, this indicates that when the first temperature detecting element 101 and the second temperature detecting element 102 are positioned on two different sides of the liquid crystal panel 100, the temperature of the display central portion S cannot be accurately estimated. In other words, this indicates that the temperature estimation of the display central portion S cannot be successfully performed when the display central portion S for which the temperature is to be estimated, and the first temperature detecting element 101 and the second temperature detecting element 102 are not under the influence of the same heat flow. This is due to the fact that the orientation of the heat flow from the display central portion S towards the first temperature detecting element 101 and the orientation of the heat flow from the display central portion S towards the second temperature detecting element 102 are completely different (different by approximately 180 degrees).

FIG. 12 is a diagram illustrating a positional relationship of the first temperature detecting element CH6, the first temperature detecting element CH5 of the display central portion S for which the temperature is to be estimated, and the second temperature detecting element 102 disposed on the holder 90, when the liquid crystal device 500a is viewed in plan view. FIG. 13 is a graph showing plotting of test values and theoretical values when the horizontal axis is the temperature T1 of the first temperature detecting element CH6 and the vertical axis is the temperature T2 of the first temperature detecting element CH5 of the display central portion S for which the temperature is to be estimated. In FIG. 12, (X1,Y1) indicates the XY coordinates at which the first temperature detecting element CH6 is positioned, and (X2,Y2) indicates the XY coordinates at which the second temperature detecting element CH5 is positioned.

As illustrated in FIG. 13, two of plot groups are divided into behavior when the cooling fan 41 is operating, and behavior when the cooling fan 41 has stopped after the illumination is turned off. In this graph, the theoretical values and the test values are superimposed using the temperature of T1 and the temperature of Th when the coefficient K is 2.5.

As a result, it can be seen that an accuracy of fit between the test values and the theoretical values is good. As illustrated in FIG. 13, the results are notably reproduced in the period up to the natural cooling process after the cooling fan 41 has stopped. From this graph, it can be seen that when the first temperature detecting element 101 and the second temperature detecting element 102 are on the same side (an X side) of the liquid crystal panel 100, the temperature of the display central portion S can be accurately estimated. Theoretically, the second temperature detecting element 102 should be provided in the vicinity of the first temperature detecting element CH6, but the temperature of the holder 90 can be substituted even when the second temperature detecting element 102 is disposed in the vicinity of the first temperature detecting element CH9.

FIG. 14 is a diagram illustrating a positional relationship of the first temperature detecting element CH8, the first temperature detecting element CH5 of the display central portion S for which the temperature is to be estimated, and the second temperature detecting element 102 disposed on the holder 90, when the liquid crystal device 500a is viewed in plan view. FIG. 15 is a graph showing plotting of test values and theoretical values when the horizontal axis is the temperature T1 of the first temperature detecting element CH8 and the vertical axis is the temperature T2 of the first temperature detecting element CH5. In FIG. 14, (X1,Y1) indicates the XY coordinates at which the first temperature detecting element CH8 is positioned, and (X2,Y2) indicates the XY coordinates at which the second temperature detecting element CH5 is positioned.

As illustrated in FIG. 15, two of plot groups are divided into behavior when the cooling fan 41 is operating, and behavior when the cooling fan 41 has stopped after the illumination is turned off. In this graph, the theoretical values and the test values are superimposed using the temperature of T1 and the temperature of Th when the coefficient K is 1.75.

As a result, it can be seen that an accuracy of fit between the test values and the theoretical values is good. As illustrated in FIG. 15, the results are notably reproduced in the period up to the natural cooling process after the cooling fan 41 has stopped. From this graph, it can be seen that when the first temperature detecting element 101 and the second temperature detecting element 102 are on the same side (a Y side) of the liquid crystal panel 100, the temperature of the display central portion S can be accurately estimated. Theoretically, the second temperature detecting element 102 should be provided in the vicinity of the first temperature detecting element CH8, but the temperature of the holder 90 can be substituted even when the second temperature detecting element 102 is disposed in the vicinity of the first temperature detecting element CH9.

As described in FIG. 12 to FIG. 15, when the temperature of the display central portion S can be accurately estimated, the smallest value of the values of the coefficient K is 1.25. This is because the first temperature detecting element CH6 is along one side that is downstream in the cooling air, and further, the temperature T1 is higher since the first temperature detecting element CH6 is close to the display central portion S. In other words, the first temperature detecting element 101 is preferably disposed along the one side that is downstream in the cooling air. Further, since the coefficient K is small, it is possible to reduce the effects of temperature measurement errors of the diode that is the first temperature detecting element 101 and the thermocouple (thermistor) that is the second temperature detecting element 102.

As illustrated in FIG. 8, in the verification test, for example, around when an elapsed time is 500 sec, the first temperature detecting element CH1 in a corner of the long side (the X side) that is upstream in the cooling air is approximately 60° C. and the first temperature detecting element CH9 in a corner of the long side (the X side) that is downstream is approximately 65° C. Further, the first temperature detecting element CH4 in the center of the long side (the X side) that is upstream in the cooling air is approximately 70° C., and the first temperature detecting element CH6 in the center of the long side (the X side) that is downstream is approximately 82° C. Thus, when positioned in the corner of the long side (the X side) the first temperature detecting element 101 is preferably disposed further downstream than upstream in the cooling air, and when positioned in the center of the long side (the X side), the first temperature detecting element 101 is preferably disposed further downstream than upstream in the cooling air.

Furthermore, when the first temperature detecting element 101 is disposed in the light blocking region E1a that surrounds the display region E, the first temperature detecting element 101 is disposed in very close proximity to the display region E. Thus, the detection temperature of the first temperature detecting element 101 can be increased. As a result, the value of the coefficient K becomes small, and it is possible to suppress the effect of a temperature measurement error of the temperature T1 or the temperature Th. Thus, the temperature T2 of the display central portion S can be accurately estimated.

Further, the coefficient K, which is an unknown value, can be more conveniently and practically determined by the test than being determined based on Expression (6). As long as there is a temperature measurement value of the diode that is the first temperature detecting element 101 and a temperature measurement value of the thermistor that is the second temperature detecting element 102, the coefficient K is calculated by solving a linear equation of Expression (5) that is a theoretical equation. When such measurements are performed a plurality of times and statistically processed, the reliable coefficient K is determined. With the temperature sensitive liquid crystals also, it is more preferable to use a plurality of temperature levels when determining the coefficient K.

Here, the temperature measurement value of the first temperature detecting element 101, the temperature measurement value of the second temperature detecting element 102, and an increase and decrease in the coefficient K will be described.

The temperature T2 of the display central portion S can be derived from the following Expression (7) using the detection temperature T1 of the first temperature detecting element 101 and the detection temperature Th of the second temperature detecting element 102.

[Expression 7]

$$T2 = K \cdot (T1 - Th) + Th \tag{7}$$

Next, a description will be made in which, when the second temperature detecting element 102 is set at a location where a lower temperature is detected, the coefficient K in Expression (6) above is reduced. It is assumed that the second temperature detecting element 102 is disposed on the liquid crystal panel 100 and that the following Expression (8) is obtained. T1 is the detection temperature of the first temperature detecting element 101, Th1 is the detection temperature of the second temperature detecting element 102, and T2 is the temperature of the display central portion S.

[Expression 8]

$$T2 = K1 \cdot (T1 - Th1) + Th1 \tag{8}$$

Next, in the same state, it is assumed that the second temperature detecting element 102 is disposed on the holder 90 and that Expression (9) is obtained. Th2 is the detection temperature of the second temperature detecting element 102. Since the state is the same as in Expression (8), T2 and T1 are the same values. However, since the location at which the second temperature detecting element 102 is disposed changes, a coefficient K1 changes to a coefficient K2.

[Expression 9]

$$T2 = K2 \cdot (T1 - Th2) + Th2 \tag{9}$$

Using Expression (8) and Expression (9), when solving K2, the following Expression (10) can be obtained. The temperature Th2 is lower than the temperature Th1 as a result of the second temperature detecting element 102 being disposed on the holder 90. Thus, Th1−Th2=ΔTh is a positive numerical value. Further, since the position of the first temperature detecting element 101 is not in the display central portion S, the coefficients K1 and K2 are numerical values larger than one.

[Expression 10]

$$K2 = K1 + (1 - K1) \cdot \Delta Th / (T1 - Th1 + \Delta Th) \tag{10}$$

K1 is larger than 1 and ΔTh is a positive numerical value. Furthermore, the temperature T1 when the projector is illuminated is higher than Th1, and thus, T1−Th1 is a positive numerical value. In other words, the denominator of the second term on the right side of Expression 10 is positive and the numerator is negative. Thus, it can be seen that K2 is less than K1. In other words, when the second temperature detecting element 102 is provided on the holder 90, the coefficient K of a temperature estimation formula for the display central portion can be reduced, and thus the effect of errors in the two temperature detecting elements can be reduced.

Further, the first temperature detecting element 101 is preferably disposed in a quadrant that is far from a cooling source. By arranging the first temperature detecting element 101 in this way, the temperature of the first temperature detecting element 101 increases, and approaches the temperature of the display central portion S. The temperature of the display central portion S is estimated by multiplying the coefficient K with a temperature difference between the first temperature detecting element 101 and the second temperature detecting element 102. Since the coefficient K is reduced, the effect of the temperature detection error is reduced. On the other hand, when the coefficient K increases, the influence of the temperature measurement error of the temperature T1 or the temperature Th increases, and a temperature estimation accuracy of the display central portion S deteriorates.

The coefficient K is a coefficient that depends on the first temperature detecting element 101, the second temperature detecting element 102, and the temperature that is wished to be known. Now, the location of the second temperature detecting element 102 is set on the one side that is downstream in the cooling air. At this time, when the first temperature detecting element 101 is set at a location at which the detection temperature can be increased, the value of the coefficient K can be reduced. When the value of the coefficient K is reduced, it is possible to suppress the effect of a temperature measurement error of the temperature T1 or the temperature Th.

In the liquid crystal device 500a, the cooling is performed by providing the cooling air from the one side. Thus, even in the same liquid crystal panel 100, the temperature is different at positions upstream and downstream in the cooling air, and the downstream temperature is high. Thus, when the first temperature detecting element 101 and the second temperature detecting element 102 are disposed along the one side of the liquid crystal panel 100 that is downstream in the cooling air, the temperature T2 of the display central portion S can be accurately estimated.

A description will be given in which, when the first temperature detecting element 101 is set at a location at which a higher temperature is detected, the coefficient K of Expression (5) becomes smaller. It is assumed that the first temperature detecting element 101 is disposed on the liquid crystal panel 100 and the following Expression (11) is obtained. The coefficient K of known art in the description is defined as a coefficient Z1.

[Expression 11]

$$T2=Z1\cdot(T1a-Th)+Th \qquad (11)$$

In the same state, it is assumed that the first temperature detecting element 101 is disposed in a section having a higher temperature in the liquid crystal panel 100, and the following Expression (12) is obtained. Th is the detection temperature of the second temperature detecting element 102. Since the state is the same as for Expression (11), T2 and Th are the same values. However, since the location at which the first temperature detecting element 101 is disposed has changed, the coefficient Z1 changes to a coefficient Z2.

[Expression 12]

$$T2=Z2\cdot(T1b-Th)+Th \qquad (12)$$

Using Expression (11) and Expression (12), when solving Z2, the following Expression (13) can be obtained. A temperature T1$b$ is higher than a temperature T1$a$, and thus, T1$a$−T1$b$=Δt1 is a negative numerical value. Further, the coefficients Z1 and Z2 are numerical values greater than one, because the position of the second temperature detecting element 102 is not the display central portion S.

[Expression 13]

$$Z2=Z1+Z1\cdot\Delta T1/(T1a-\Delta T1-Th) \qquad (13)$$

Furthermore, since the temperature T1$a$ of the first temperature detecting element 101 when the projector is illuminated is higher than Th, T1$a$−Th is a positive numerical value. That is, the denominator of the second term on the right side of Expression (13) is positive and the numerator is negative. Thus, it can be seen that Z2 is smaller than Z1. Note that it is not necessary to limit the temperature estimation of the display central portion S to Expression (5), because Expression (14) can be obtained by modifying Expression (5). Here, γ=K−1.

[Expression 14]

$$T2=Y\cdot(T1-Th)+T1 \qquad (14)$$

As described above, the liquid crystal device 500 is provided with the liquid crystal panel 100 including the display region E, the holder 90 that holds the liquid crystal panel 100, the first temperature detecting element 101 that is disposed on the liquid crystal panel 100 and detects the temperature of the liquid crystal panel 100, and the second temperature detecting element 102 that is disposed on the holder 90 and detects the temperature of the holder 90. The first temperature detecting element 101 and the second temperature detecting element 102 are disposed in the same quadrant when the four quadrants are defined by the X axis line passing through the center of the display region E and the Y axis line passing through the center of the display region E and orthogonal to the X axis line.

According to this configuration, since the first temperature detecting element 101 and the second temperature detecting element 102 are disposed in the same quadrant, the temperature of the display central portion S can be estimated with a high degree of accuracy based on the detection temperatures of the two temperature detecting elements 101 and 102 that are considered to be under the influence of the same heat flow. Further, since the second temperature detecting element 102 is disposed on the holder 90 rather than in the liquid crystal panel 100, the detection temperature of the second temperature detecting element 102 can be lowered. As a result, the value of the coefficient K can be reduced, and thus, the effects of temperature measurement errors of the first temperature detecting element 101 and the second temperature detecting element 102 can be reduced. Thus, the temperature T2 of the display central portion S can be accurately estimated.

Further, the liquid crystal panel 100 is disposed in the flow of the refrigerant for cooling the liquid crystal panel 100, and the first temperature detecting element 101 is disposed to be downstream in the flow of the refrigerant.

According to this configuration, the first temperature detecting element 101 is disposed in the quadrant that is far from an inflow side of the refrigerant, and thus the detection temperature of the first temperature detecting element 101 can be increased. As a result, the value of the coefficient K can be reduced, and therefore, the effects of temperature measurement errors of the first temperature detecting element 101 and the second temperature detecting element 102 can be reduced. Thus, the temperature T2 of the display central portion S can be accurately estimated.

Further, the coordinates X1 in Expression (5) are set in the vicinity of the end portion of the opening 51 of the holder 90 that is substantially synonymous with the incidence region of the light onto the liquid crystal panel 100. The light blocking region E1$a$ is present at the end portion of the opening 51 of the holder 90. Thus, it is preferable to dispose the first temperature detecting element 101 in the light blocking region E1$a$. When disposed in the light blocking region E1a, which is a position that does not overlap the display region E, layout restrictions on the first temperature detecting element 101 are also small and the first temperature detection element 101 is also in very close proximity to the display area E.

According to this configuration, since the first temperature detecting element 101 is disposed in very close proximity to the display region E, the detection temperature of the first temperature detecting element 101 can be increased. As a result, the value of the coefficient K can be reduced, and therefore, the effects of the temperature measurement errors of the first temperature detecting element 101 and the second temperature detecting element 102 can be reduced. Thus, the temperature T2 of the display central portion S can be accurately estimated. Note that the coordinates X1 are the incidence region of the light onto the liquid crystal panel 100, and can be freely set as long as the region for which the temperature is to be estimated is under the influence of the same heat flow as the second temperature detecting element 102. Therefore, the first temperature detecting element 101 is not prohibited from being disposed in the display region E.

Further, the liquid crystal device 500 is provided with the liquid crystal panel 100, the holder 90 that holds the liquid crystal panel 100, the first temperature detecting element 101 that detects the temperature of the liquid crystal panel 100, and the second temperature detecting element 102 that detects the temperature of the holder 90. The first temperature detecting element 101 is disposed on the liquid crystal panel 100, and the second temperature detecting element 102 is disposed on the holder 90. When the temperature of the display central portion S of the liquid crystal panel 100 is T(X2), the temperature of the first temperature detecting element 101 is T(X1), the temperature of the second temperature detecting element 102 is Th, and the coefficient is K, the first temperature detecting element 101 and the second temperature detecting element 102 are disposed such that K is equal to or less than 3 in Expression (5).

According to this configuration, for example, if the temperature measurement error of each of the first temperature detecting element 101 and the second temperature detecting element 102 is approximately ±1° C., for example, an estimated temperature error of the display central portion S can be set to approximately ±4° C. or less, when the coefficient K of Expression (5) is 3. In this way, when a control temperature range of around 10° C. for the liquid crystal panel is desired, this can be achieved. As repeatedly described above, by reducing the value of the coefficient K, the temperature measurement accuracy of the display central portion S is improved, and, temperature control can thus be made easier. In order to reduce the value of the coefficient K, the first temperature detecting element 101 is disposed in a high temperature section (in the example, the light blocking region E1a of the liquid crystal panel 100) under the influence of the same heat flow (in the same quadrant or on the same side in the example), and the second temperature detecting element 102 is disposed in a low temperature section (the holder 90 in the example).

Further, the projector 1000 is provided with the liquid crystal device 500 described above, and thus the projector 1000 capable of improving display quality can be provided. Further, Expression (5), which is the temperature estimation formula for the display region E, does not require information about the ambient temperature or the intensity of the incident light. Thus, a complex lookup table for cooling control configured in accordance with the cooling setting and the projection brightness of the projector 1000, and the like can be made unnecessary.

Second Embodiment

Figure 16:
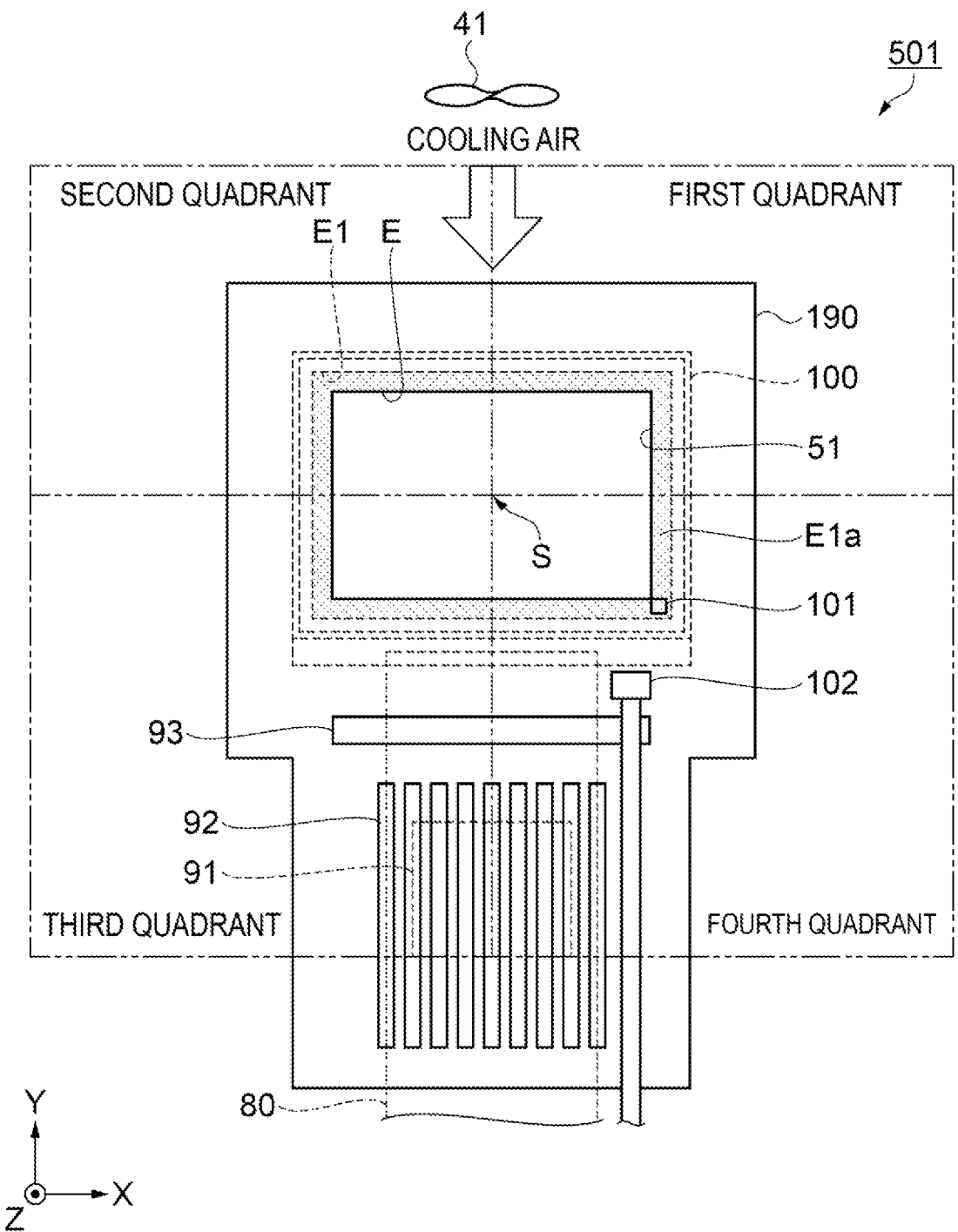
FIG. 16 is a plan view illustrating a configuration of a liquid crystal device according to a second embodiment.

As illustrated in FIG. 16, in a liquid crystal device 501 according to a second embodiment, a holder 190 is formed to be extended to an extending side on the wiring substrate 80 side, heat dissipating fins 92 are further formed, and a section on which a panel driving IC 91 is disposed on the wiring substrate 80 is different from the liquid crystal device 500 of the first embodiment. Other parts of the configuration are generally similar. Thus, in the second embodiment, portions different from those of the first embodiment will be described in detail, and a description of other common portions will be omitted as appropriate.

In the liquid crystal device 501 according to the second embodiment, the heat dissipating fins 92 are formed in the holder 190. Further, in the liquid crystal device 501, the panel driving IC 91 is disposed on the wiring substrate 80 that is electrically coupled to the liquid crystal panel 100. The holder 190 is in contact with the panel driving IC 91 using a thermally conductive material, and boosts heat dissipation of the panel driving IC 91 by the heat dissipating fins 92. Similar to the first embodiment, the first temperature detecting element 101 is disposed so as to overlap the light blocking region E1a. The second temperature detecting element 102 is disposed on the liquid crystal panel 100 side of the panel driving IC 91.

When the panel driving IC 91 generates heat, the temperature Th of the second temperature detecting element 102 provided on the holder 190 increases. However, the temperature of the holder 190 as a heat dissipation destination in Expression (5) can be monitored as Th by the second temperature detecting element 102. Thus, when Expression (5) is established and the temperature T1 of the first temperature detecting element 101 and the temperature Th of the second temperature detecting element 102 can be monitored, the temperature T2 of the display central portion S can be estimated. Note that when there is a slit 93 that inhibits an increase in temperature caused by the heat generated by the panel driving IC 91, an unnecessary temperature increase in a mounting portion of the second temperature detecting element 102 of the holder 190 can be suppressed and the provision of the slit 93 is thus preferable. Since the temperature Th of the second temperature detecting element 102 becomes low, the value of the coefficient K is reduced, and it is possible to accurately estimate the temperature T2 of the display central portion S.

Figure 17:
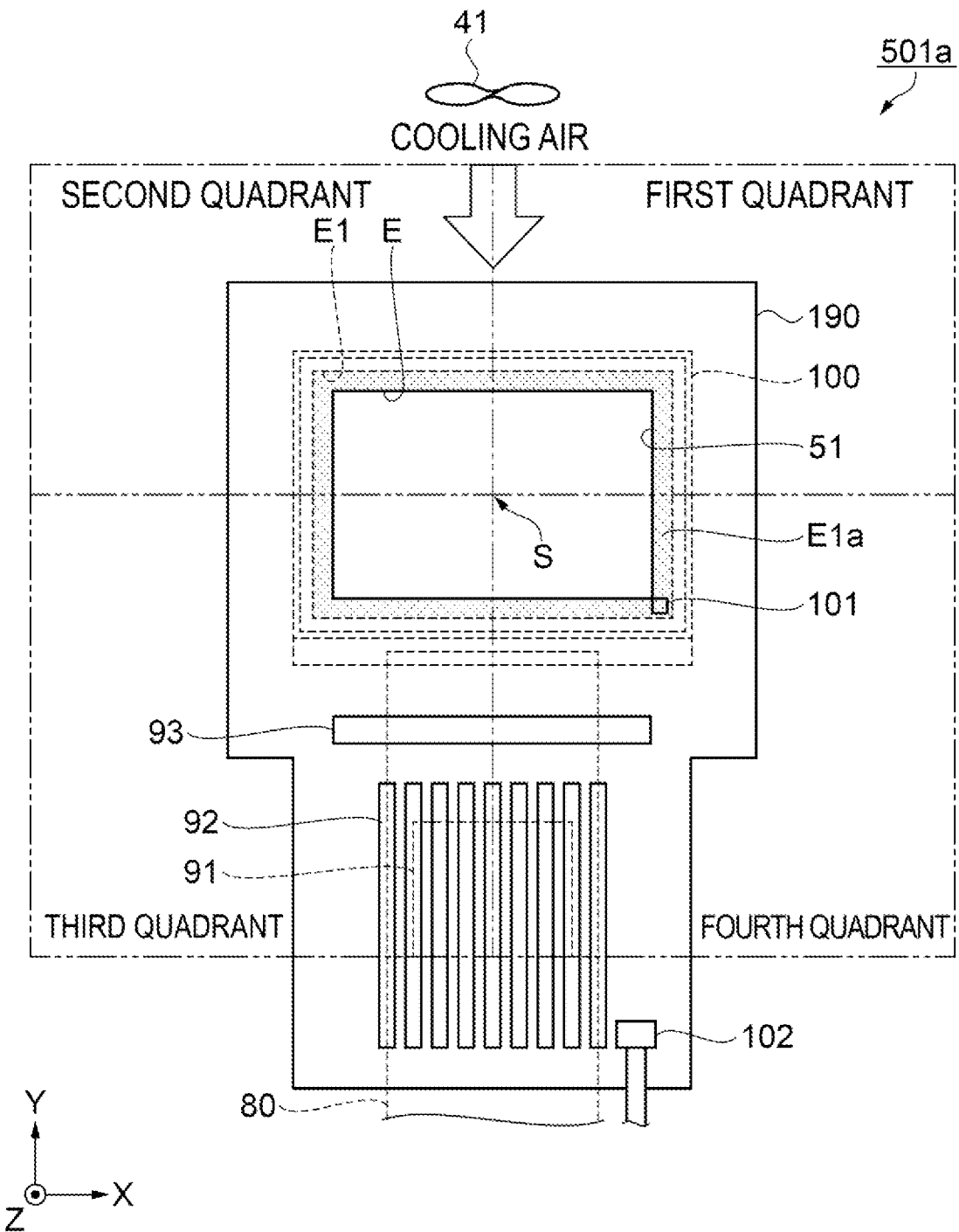
FIG. 17 is a plan view illustrating a configuration of a liquid crystal device of a comparison example.

Next, a comparative example of the second embodiment will be described with reference to FIG. 17. In a liquid crystal device 501a of the comparative example, the second temperature detecting element 102 is disposed on the holder 190 at a location separated from a coupling side with the panel driving IC 91. According to this configuration, a heat generation source caused by the panel driving IC 91 is present between the first temperature detecting element 101 and the second temperature detecting element 102. Furthermore, due to the influence of the cooling air, the temperature detected by the second temperature detecting element 102 is different from the temperature of the holder 190 that is a heat dissipation destination. It is therefore extremely difficult to ascertain the temperature of the holder 190, which is the heat dissipation destination in Expression (5). Specifically, with the temperature Th of the second temperature detecting element 102, the estimation of the temperature T2 of the display central portion S is impaired. In other words, the temperature of the holder 190 cannot be appropriately monitored.

As described above, the liquid crystal device 501 according to the second embodiment is provided with the wiring substrate 80 electrically coupled to the liquid crystal panel 100, and the panel driving IC 91 disposed on the wiring substrate 80. The panel driving IC 91 is disposed in a position overlapping the holder 190 in plan view, and the second temperature detecting element 102 is disposed on the first temperature detecting element 101 side of the panel driving IC in plan view.

According to this configuration, there is no heat generation source caused by the panel driving IC 91 between the first temperature detecting element 101 and the second temperature detecting element 102. Thus, the temperature of the display central portion S of the liquid crystal panel 100 can be detected using Expression (5). Thus, the temperature T2 of the display central portion S can be accurately estimated.

Further, the heat dissipating fins 92 that inhibit the heat flow of the panel driving IC 91 are provided on the holder 190, and the panel driving IC 91 is disposed in contact with the holder 190 provided with the heat dissipating fins 92.

This configuration is preferable, since an unnecessary temperature increase in the mounting portion of the second temperature detecting element 102 of the holder 190 can be suppressed by the heat dissipating fins 92. Since the temperature Th of the second temperature detecting element 102 is reduced, the value of the coefficient K is reduced, and the temperature T2 of the display central portion S can be accurately estimated.

Third Embodiment

Figure 18:
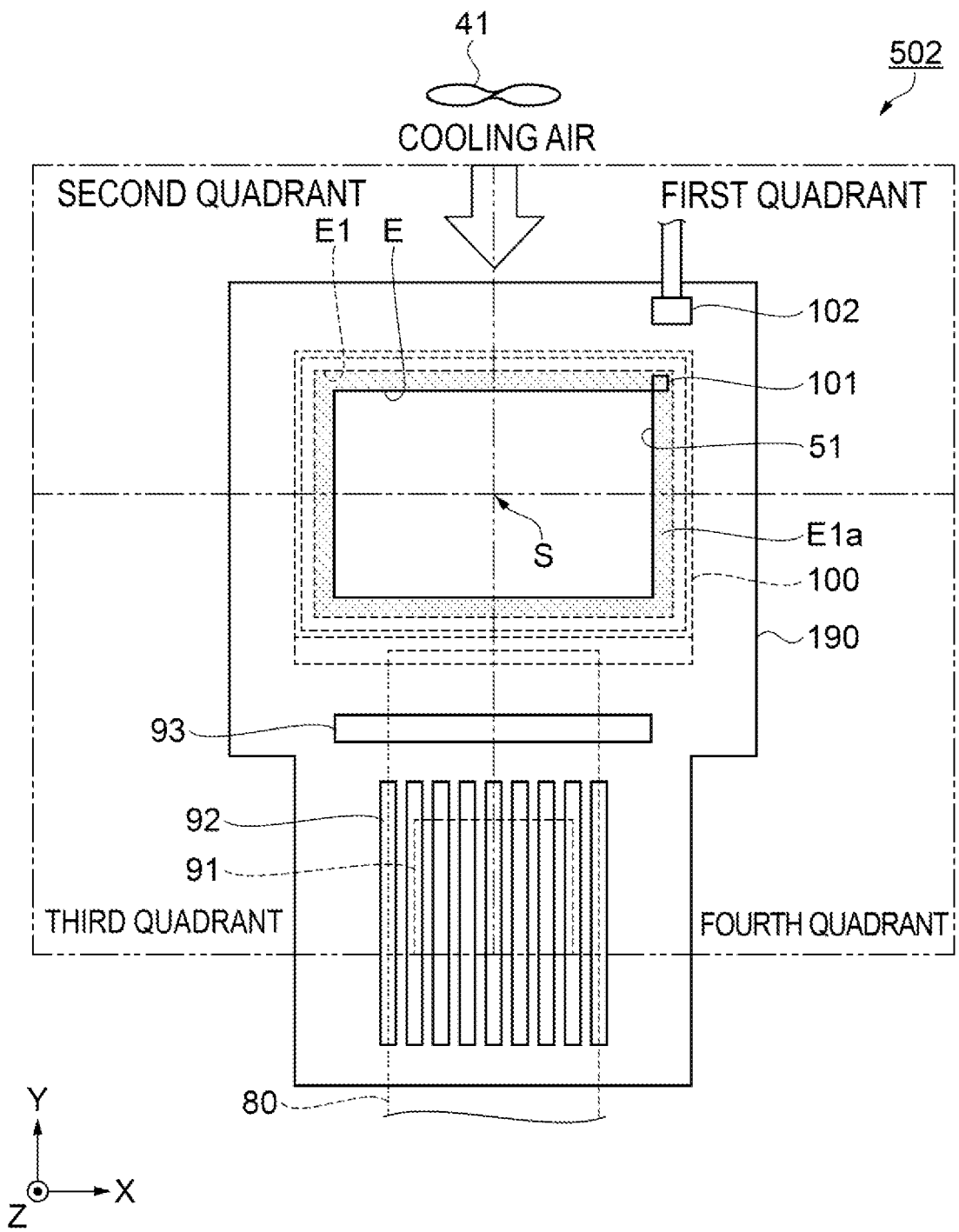
FIG. 18 is a plan view illustrating a configuration of a liquid crystal device according to a third embodiment.

As illustrated in FIG. 18, a liquid crystal device 502 according to a third embodiment differs from the liquid crystal device 501 according to the second embodiment in that the first temperature detecting element 101 and the second temperature detecting element 102 are disposed in different positions. Other parts of the configuration are generally similar. Thus, in the third embodiment, portions different from those of the second embodiment will be described in detail, and a description of other common portions will be omitted as appropriate.

In the liquid crystal device 502 according to the third embodiment, the first temperature detecting element 101 and the second temperature detecting element 102 are disposed on the side opposite to the coupling side with the panel driving IC 91. Specifically, the first temperature detecting element 101 and the second temperature detecting element 102 are disposed in the first quadrant. The first temperature detecting element 101 is disposed on the element substrate 10 of the light blocking region E1a in the first quadrant. The second temperature detecting element 102 is disposed on the holder 190 in the first quadrant.

In this case, since the first temperature detecting element 101 is disposed in the first quadrant, the detection temperature is lowered. As a result, the value of the coefficient K increases, so an error in the estimation of the temperature T2 of the display central portion S increases. However, as long as this is within an acceptable range, the influence of heat generation from the panel driving IC 91 is efficiently suppressed, and thus, the temperature T2 of the display central portion S can be estimated using the simple Expression (5).

As described above, the first temperature detecting element 101 and the second temperature detecting element 102 are disposed on the side of the liquid crystal panel 100 opposite to the coupling side with the panel driving IC 91.

According to this configuration, since the first temperature detecting element 101 and the second temperature detecting element 102 are disposed on the side opposite to the coupling side, it is possible to detect the temperature of the liquid crystal panel 100 at positions that are not affected by the heat generation of the panel driving IC 91. Thus, the temperature of the display central portion S can be estimated using the simple Expression (5).

Fourth Embodiment

Figure 19:
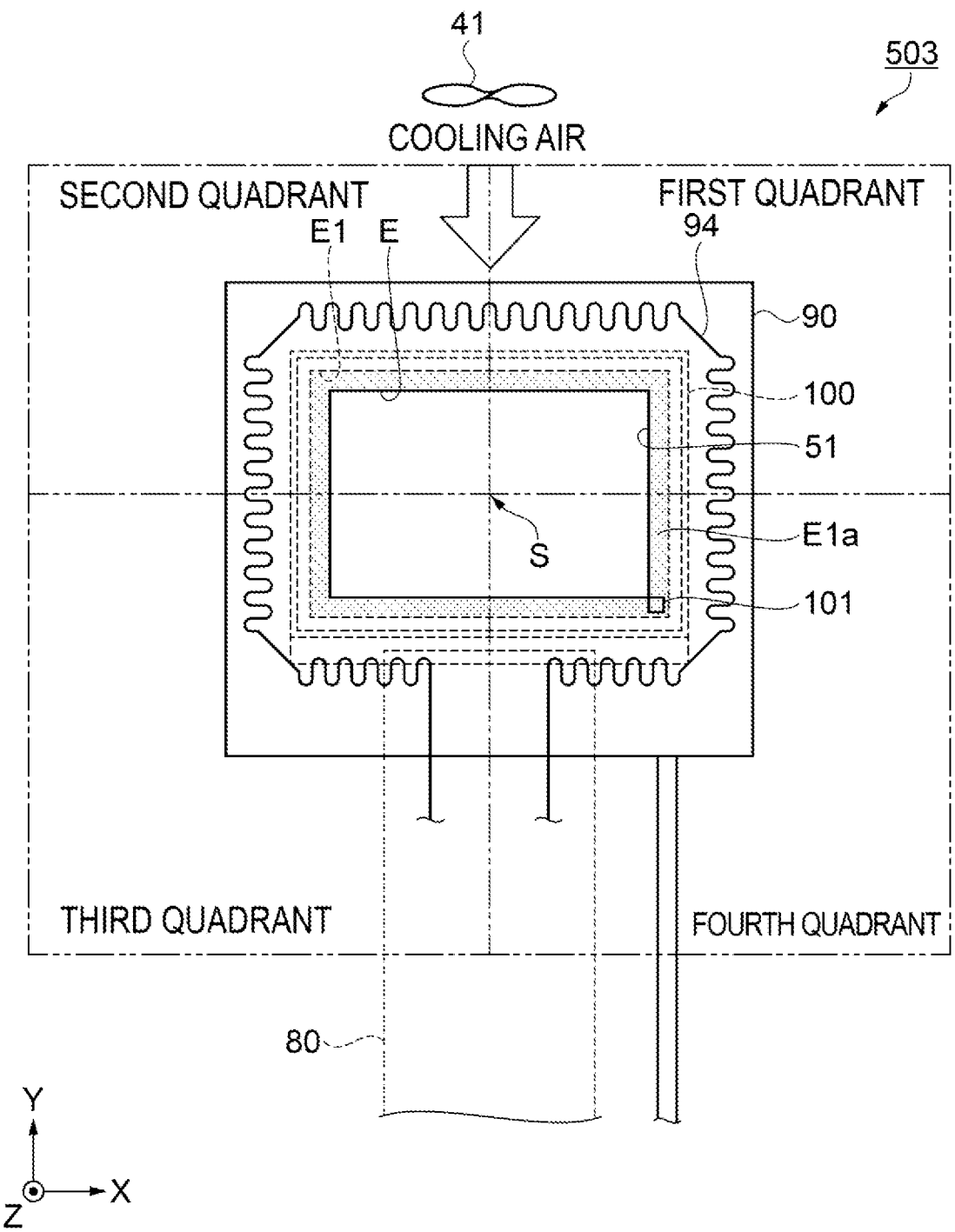
FIG. 19 is a plan view illustrating a configuration of a liquid crystal device according to a fourth embodiment.
Figure 20:
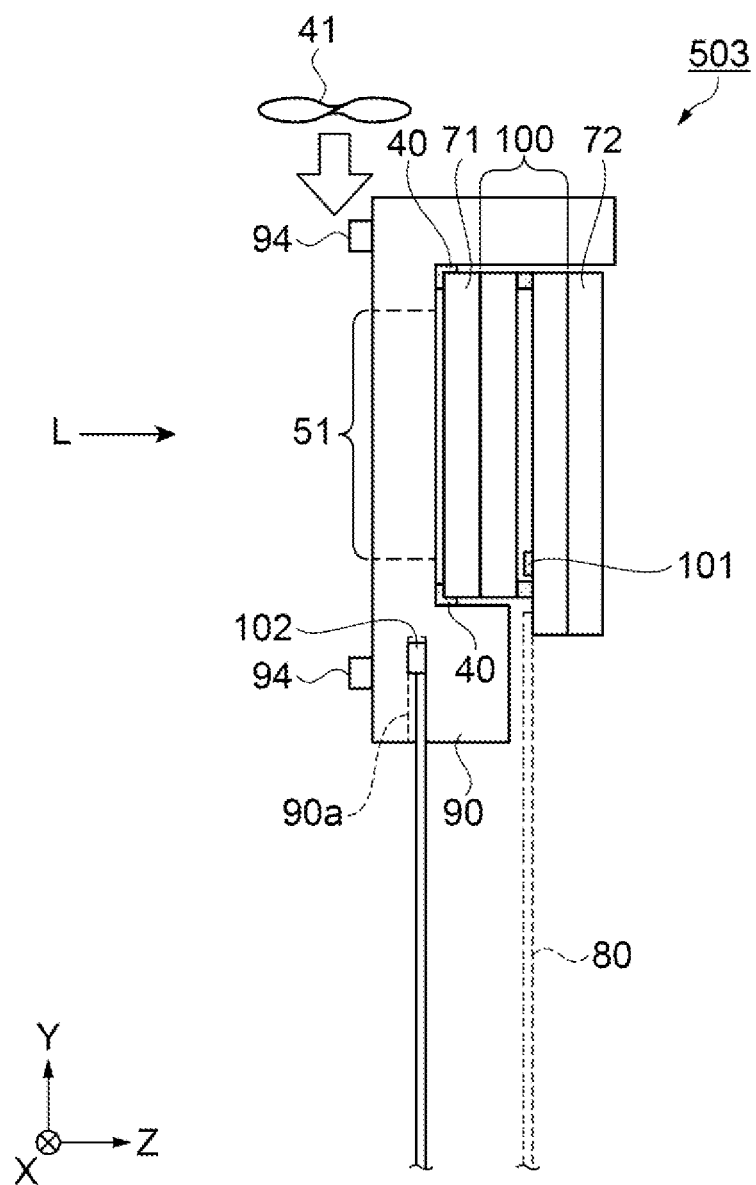
FIG. 20 is a cross-sectional view illustrating a configuration of the liquid crystal device illustrated in FIG. 19.

As illustrated in FIG. 19 and FIG. 20, a liquid crystal device 503 according to a fourth embodiment differs from the liquid crystal device 500 of the first embodiment in that a heater 94, which is a heating device that warms the liquid crystal panel 100, is disposed on the upper surface of the holder 90. Other parts of the configuration are generally similar. The other portions are substantially the same as those of the third embodiment, and thus, in the fourth embodiment, portions different from those of the third embodiment will be described in detail, and a description of other common portions will be omitted as appropriate. A configuration in which the heater 94 is provided in the liquid crystal device in this manner is conceivable for the purpose of preventing a deterioration in the response rate of the liquid crystals in a low-temperature environment and optimizing a drive voltage.

As described above, in the liquid crystal device 503 according to the fourth embodiment, the heater 94 is disposed on the upper surface of the holder 90. The heater 94 is, for example, a film heater. In a similar manner to the first embodiment, the first temperature detecting element 101 is disposed at a position overlapping the light blocking region E1a on the element substrate 10 in the fourth quadrant.

The second temperature detecting element 102 is embedded in a mounting hole 90a (see FIG. 20) formed, in the fourth quadrant, in a central portion in the thickness direction of the holder 90. In other words, as illustrated in FIG. 20, the second temperature detecting element 102 is disposed in the holder 90 between the heater 94 and the first temperature detecting element 101 in a cross-sectional view. Note that in the cross-sectional view, the second temperature detecting element 102 is preferably disposed closer to the liquid crystal panel 100 than to the heater 94.

Figure 21:
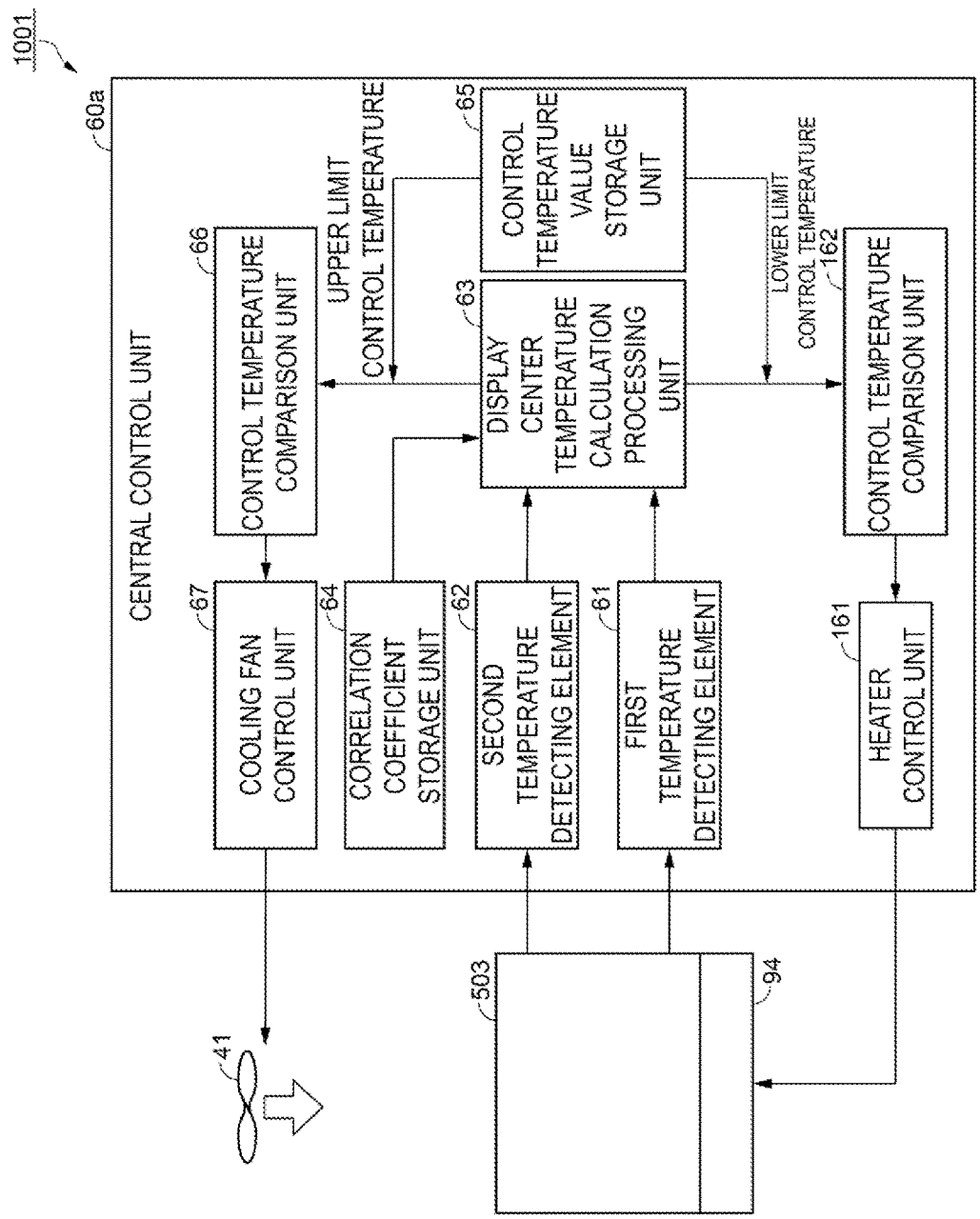
FIG. 21 is a block diagram illustrating an electrical configuration of a projector.

Next, an electrical configuration of a projector 1001 provided with the liquid crystal device 503 according to the fourth embodiment will be described with reference to FIG. 21. As illustrated in FIG. 21, the projector 1001 is provided with the liquid crystal device 503, the heater 94, a central control unit 60a, and the cooling fan 41. In addition to the central control unit 60 of the projector 1000 according to the first embodiment, the central control unit 60a is provided with a heater control unit 161 and a control temperature comparison unit 162.

In a similar manner to the first embodiment, first, the temperature measurement value of the first temperature detecting element 101 and the temperature measurement value of the second temperature detecting element 102 are calculated. Next, the estimated temperature of the display central portion S is calculated with reference to the value stored in the correlation coefficient storage unit 64. Thereafter, the control temperature comparison unit 66 compares the estimated temperature of the display central portion S with an control temperature upper limit value stored in the control temperature value storage unit 65, and determines the operation of the cooling fan 41 by the cooling fan control unit 67 so that the estimated temperature of the display central portion S does not exceed the control temperature upper limit value. The effective drive voltage of the cooling fan 41 is adjusted by PWM operation, for example, and the amount of cooling air is controlled.

On the other hand, the control temperature comparison unit 162 compares the estimated temperature with a control temperature lower limit value stored in the control temperature value storage unit 65, and determines the control of the heater 94 by the heater control unit 161 so that the estimated temperature of the display central portion S does not fall below the control temperature lower limit value. In other words, the temperature of the low temperature liquid crystal panel 100 is heated to an appropriate temperature. As a result, the response speed of the liquid crystals is made appropriate. Note that the control temperature comparison unit 162 may be configured to output the temperature measurement value of the first temperature detecting element 101 rather than the estimated temperature of the display central portion S. Since the four corners of the display region E are close to regions of the display region E at which the temperature is lowest, by considering the temperature measurement value of the first temperature detecting element 101 to be the lowest temperature of the display region E, it is possible to easily determine whether the entire display region E is equal to or greater than the control temperature lower limit value.

The second temperature detecting element 102 is disposed in the holder 90 between the heater 94 and the first temperature detecting element 101. When there is heat generation from the heater 94, the temperature Th of the second temperature detecting element 102 provided in the holder 90 increases. However, there is no heat generation source between the first temperature detecting element 101 and the second temperature detecting element 102. Thus, as long as the temperature T1 of the first temperature detecting element 101 and the temperature Th of the second temperature detecting element 102, which is the heat dissipation destination in Expression (5), can be monitored, the temperature T2 of the display central portion S can be estimated using Expression (5). Note that if the heater 94 and the second temperature detecting element 102 come into contact with each other, the detection temperature of the second temperature detecting element 102 is increased by the heated heater 94, and this diverges from the temperature to be used as the heat dissipation destination in Expression (5). For this reason, a structural component of the holder 90 may be interposed between the heater 94 and the second temperature detecting element 102.

As described above, the liquid crystal device 503 according to the fourth embodiment is provided with the heater 94 that warms the liquid crystal panel 100, and the second temperature detecting element 102 is disposed in the holder 90 between the heater 94 and the first temperature detecting element 101.

According to this configuration, there is no heat generation source between the first temperature detecting element 101 and the second temperature detecting element 102. Thus, the temperature of the display central portion S can be estimated with a high degree of accuracy using Expression (5).

Note that the configurations of the liquid crystal devices 500, 501, 502, and 503 according to the first to fourth embodiments have been described, but the configuration is not limited to these configurations, and may be a configuration as described below.

Figure 22:
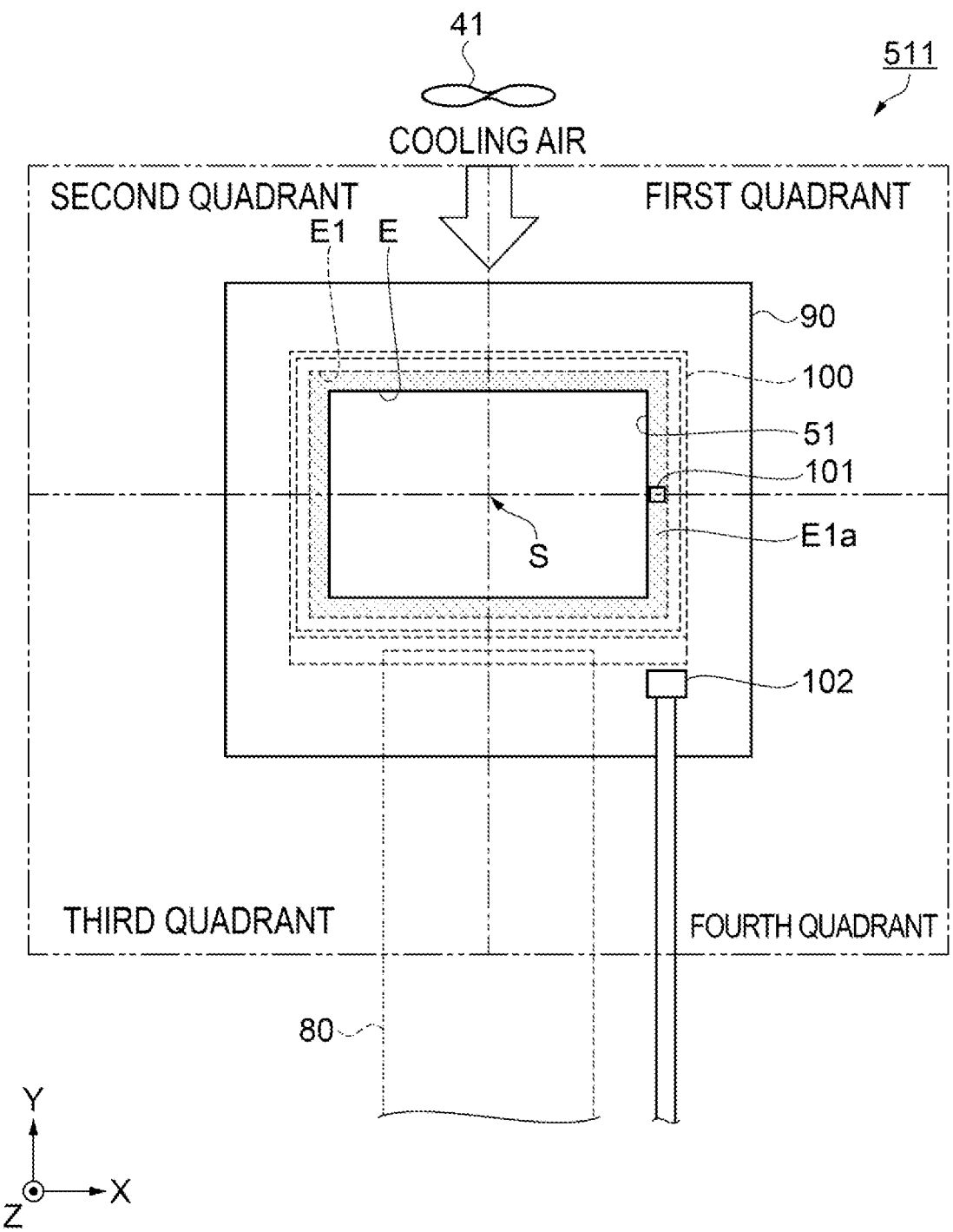
FIG. 22 is a plan view illustrating a configuration of a liquid crystal device of a modified example.

FIG. 22 is a plan view illustrating a configuration of a liquid crystal device 511, which is a modified example of the liquid crystal device 500 according to the first embodiment. In comparison to the configuration of the liquid crystal device 500 according to the first embodiment, in the liquid crystal device 511, the position of the first temperature detecting element 101 is different. Specifically, the first temperature detecting element 101 is disposed in the central portion of the right side of the liquid crystal panel 100. According to this configuration, since the first temperature detecting element 101 and the second temperature detecting element 102 are disposed in the same fourth quadrant, the temperature of the display center portion S can be estimated with a high degree of accuracy.

Figure 23:
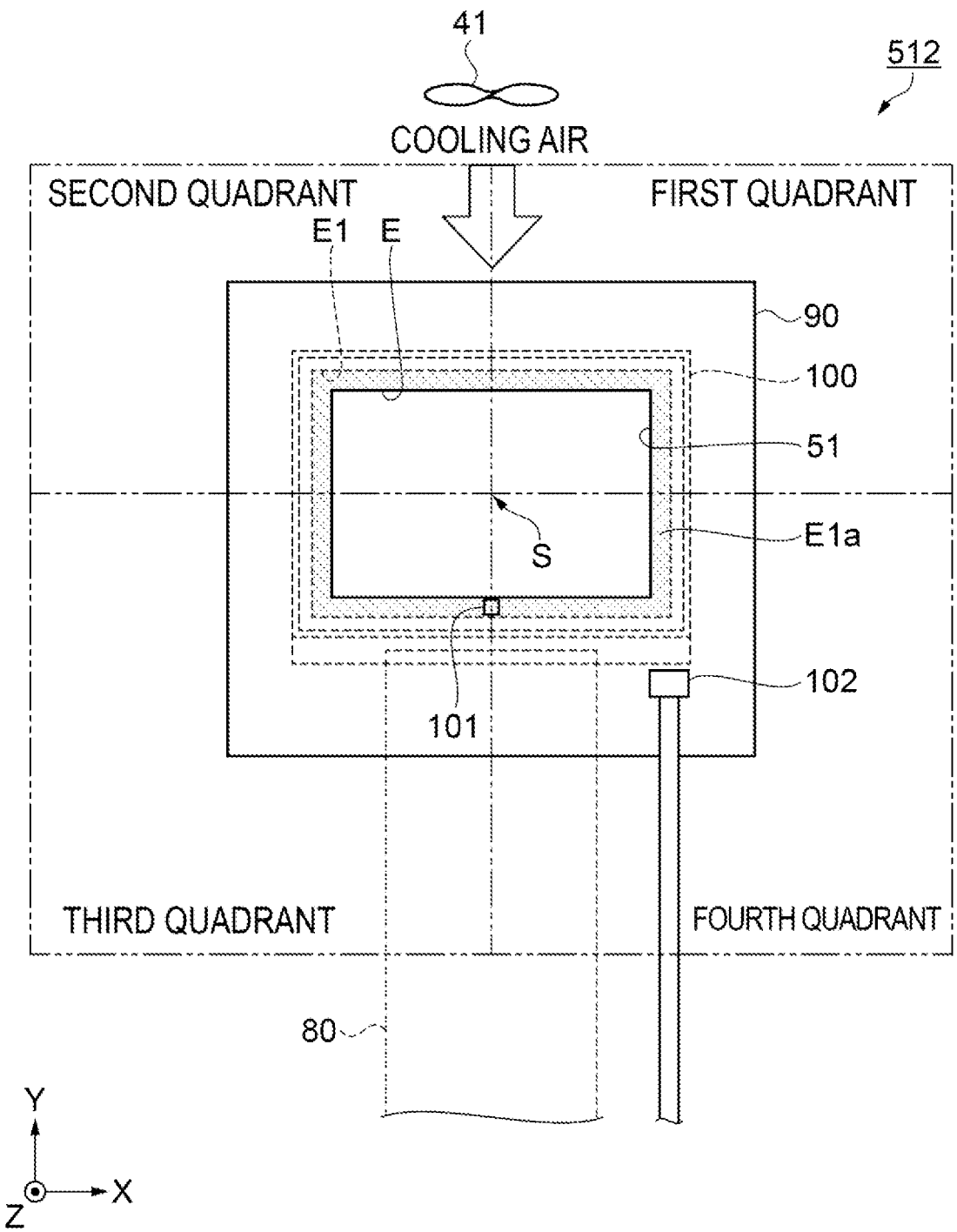
FIG. 23 is a plan view illustrating a configuration of a liquid crystal device of a modified example.

FIG. 23 is a plan view illustrating a configuration of a liquid crystal device 512, which is a modified example of the liquid crystal device 500 according to the first embodiment. In comparison to the configuration of the liquid crystal device 500 according to the first embodiment, in the liquid crystal device 512, the position of the first temperature detecting element 101 is different. Specifically, the first temperature detecting element 101 is disposed in the central portion of the lower side of the liquid crystal panel 100. According to this configuration, since the first temperature detecting element 101 and the second temperature detecting element 102 are disposed in the same fourth quadrant, the temperature of the display center portion S can be estimated with a high degree of accuracy.

Figure 24:
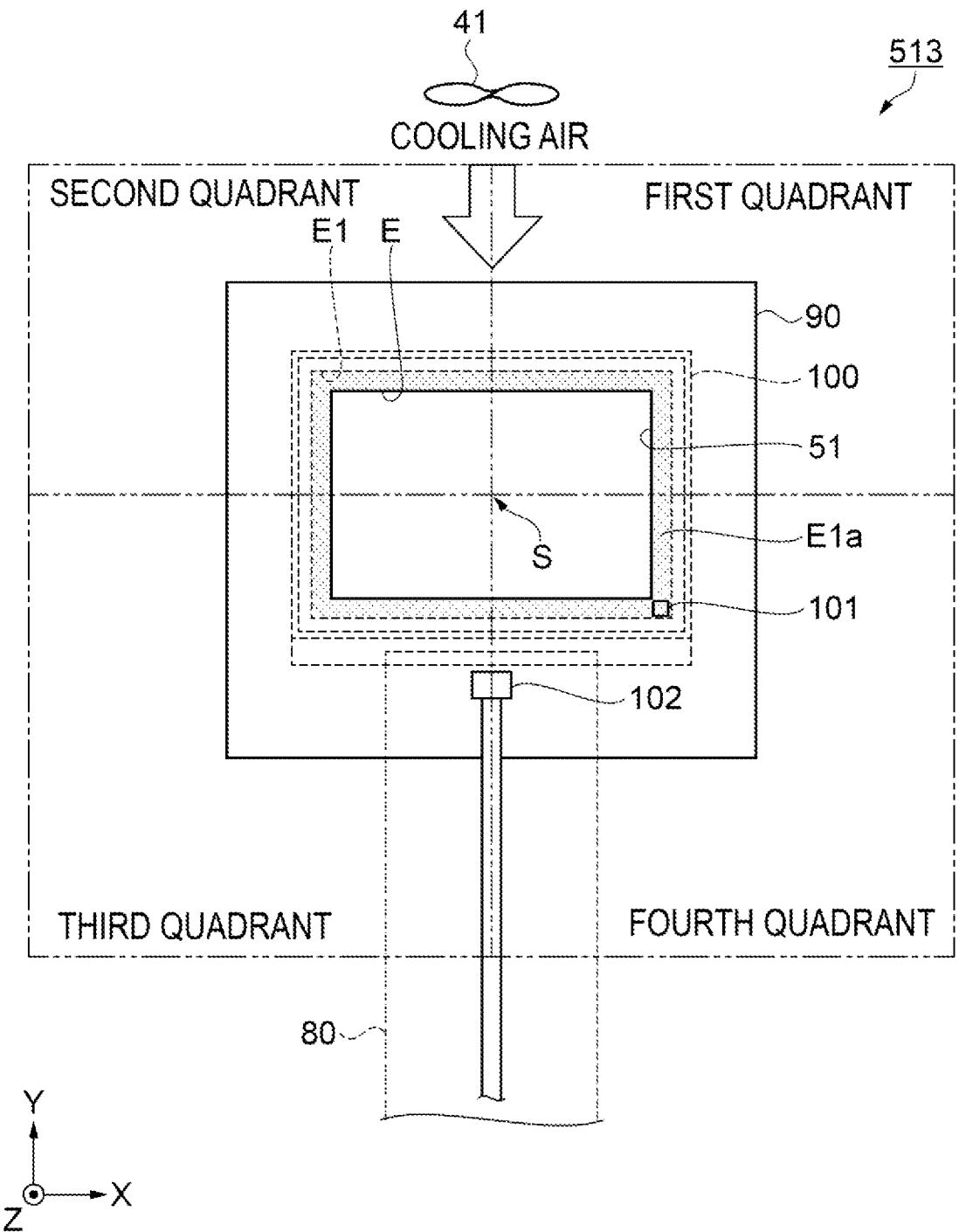
FIG. 24 is a plan view illustrating a configuration of a liquid crystal device of a modified example.

FIG. 24 is a plan view illustrating a configuration of a liquid crystal device 513, which is a modified example of the liquid crystal device 500 according to the first embodiment. In comparison to the configuration of the liquid crystal device 500 according to the first embodiment, in the liquid crystal device 513, the position of the second temperature detecting element 102 is different. Specifically, the second temperature detecting element 102 is disposed at the central portion of the lower side of the holder 90. According to this configuration, since the first temperature detecting element 101 and the second temperature detecting element 102 are disposed in the same fourth quadrant, the temperature of the display central portion S can be estimated with a high degree of accuracy.

Figure 25:
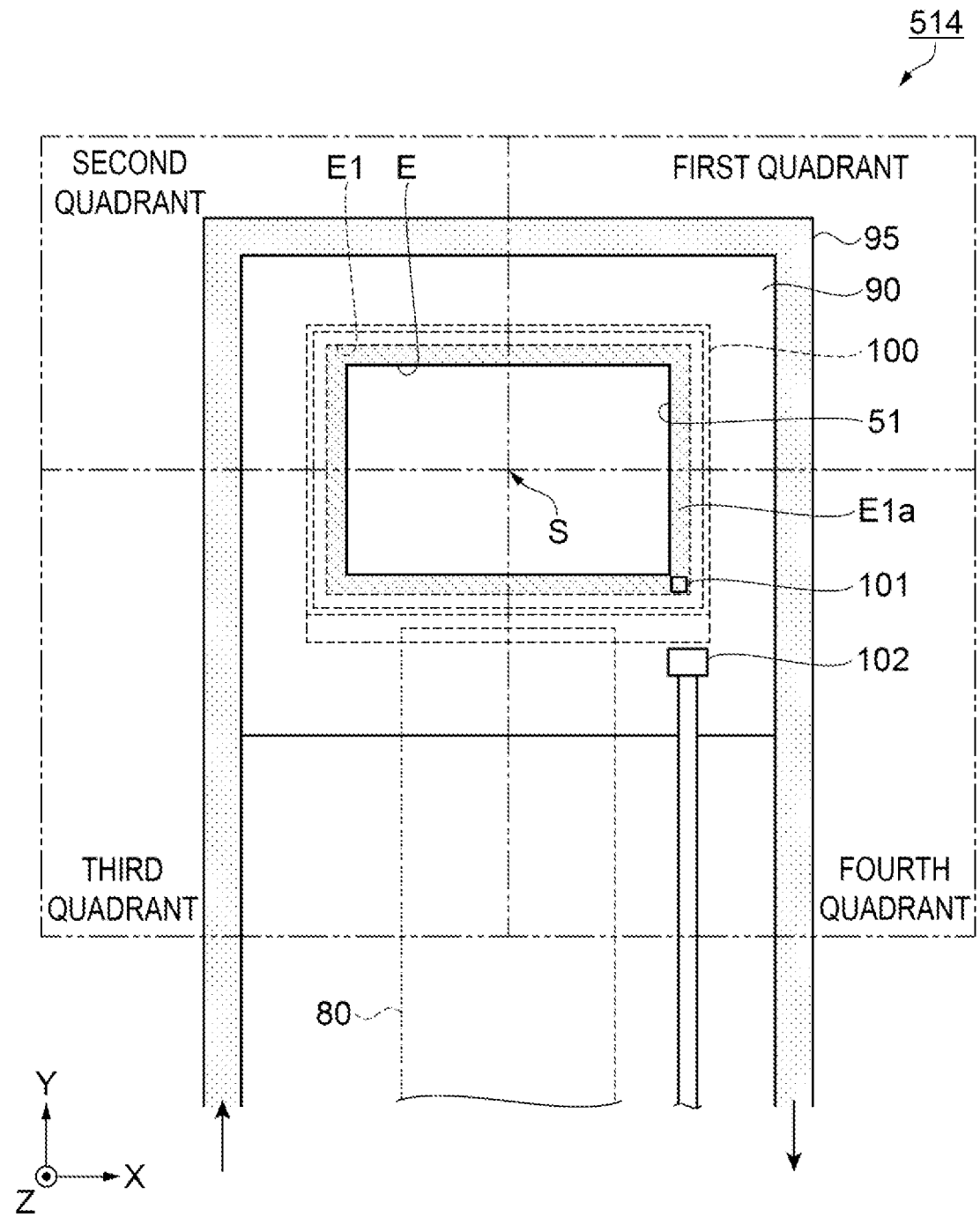
FIG. 25 is a plan view illustrating a configuration of a liquid crystal device of a modified example.

FIG. 25 is a plan view illustrating a configuration of a liquid crystal device 514, which is a modified example of the liquid crystal device 500 according to the first embodiment. In comparison to the configuration of the liquid crystal device 500 according to the first embodiment, a portion of the liquid crystal device 514 differs in that, in place of the cooling fan 41, a cooling medium flows through a cooling pipe 95 provided surrounding the periphery of the holder 90, and performs cooling. In other words, liquid cooling is performed instead of air cooling. The first temperature detecting element 101 and the second temperature detecting element 102 are disposed at the same positions as in the first embodiment.

In the course of conveying the heat from the liquid crystal panel 100, the cooling medium in the cooling pipe 95 has a higher temperature at an outlet side than at an inlet side. As a result, the temperature of the liquid crystal panel 100 tends to increase on the fourth quadrant side. Thus, the first temperature detecting element 101 and the second temperature detecting element 102 are preferably disposed in a region far from the cooling source, that is, in the fourth quadrant. In this way, the detection temperature of the first temperature detecting element 101 can be increased, and thus the value of the coefficient K is reduced, and the effect of the temperature measurement error of the temperature T1 or the temperature Th can be suppressed. As a result, the temperature T2 of the display central portion S can be accurately estimated. Note that the cooling medium in the cooling pipe 95 has a low temperature on the inlet side, and thus, in the holder 90, the third quadrant side is more easily cooled. Since the detection temperature of the second temperature detecting element 102 can be reduced and the value of the coefficient K can be reduced, it is also an option to dispose the first temperature detecting element 101 and the second temperature detecting element 102 on the third quadrant side. Whether the first temperature detecting element 101 and the second temperature detecting element 102 are disposed on the fourth quadrant side or on the third quadrant side may be determined by the magnitude of the coefficient K.

Figure 26:
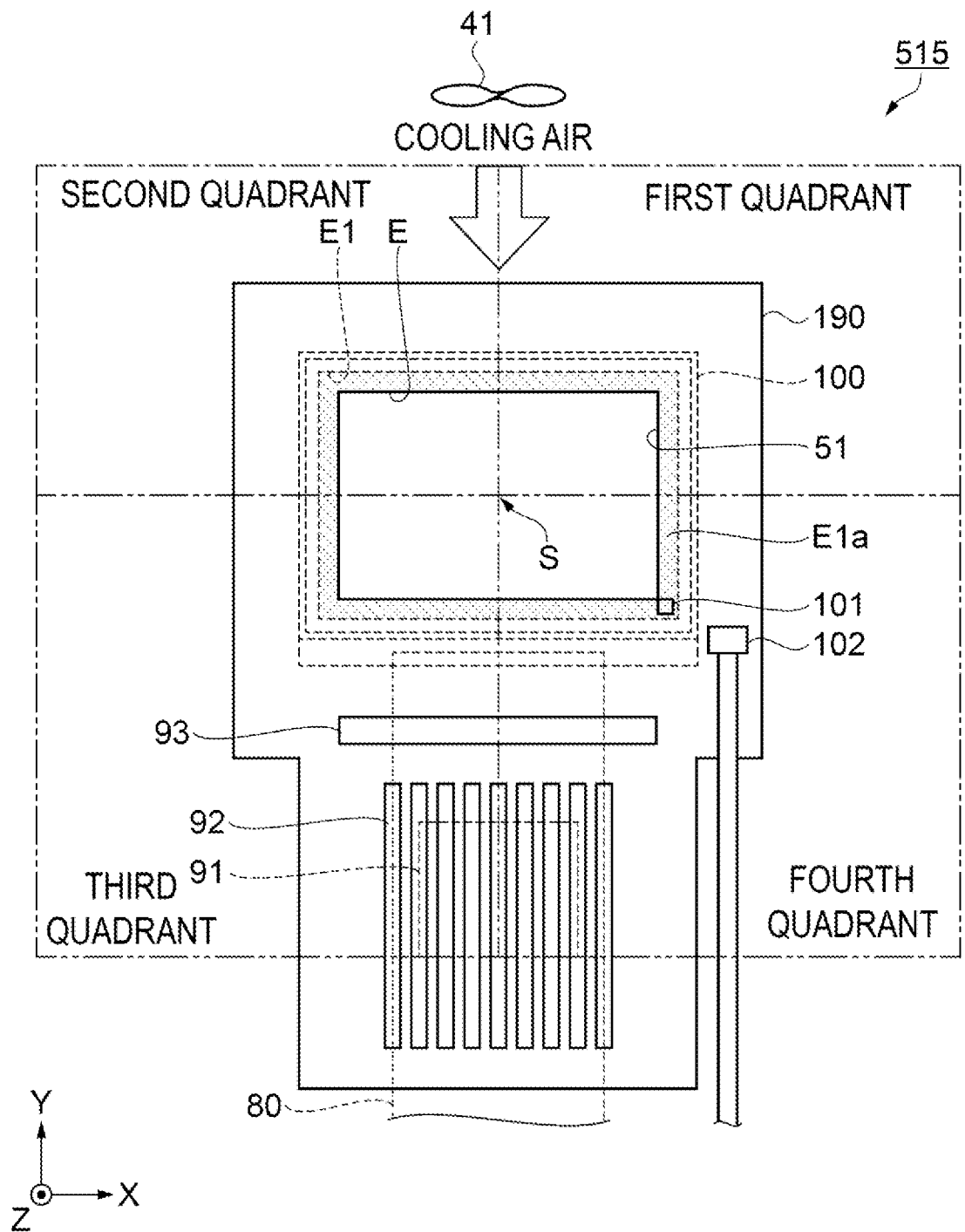
FIG. 26 is a plan view illustrating a configuration of a liquid crystal device of a modified example.

FIG. 26 is a plan view illustrating a configuration of a liquid crystal device 515, which is a modified example of the liquid crystal device 501 according to the second embodiment. In comparison to the configuration of the liquid crystal device 501 according to the second embodiment, a portion of the liquid crystal device 515 differs in that the second temperature detecting element 102 is disposed closer to the right side of the holder 90. According to this configuration, the second temperature detecting element 102 is disposed so as to be farther from the panel driving IC 91, and it is thus possible to suppress the effect of the heat generated from the panel driving IC 91. As a result, an increase in the detection temperature of the second temperature detecting element 102 can be suppressed, the value of the coefficient K can be reduced, and the temperature of the display central portion S can be estimated with a high degree of accuracy.

Figure 27:
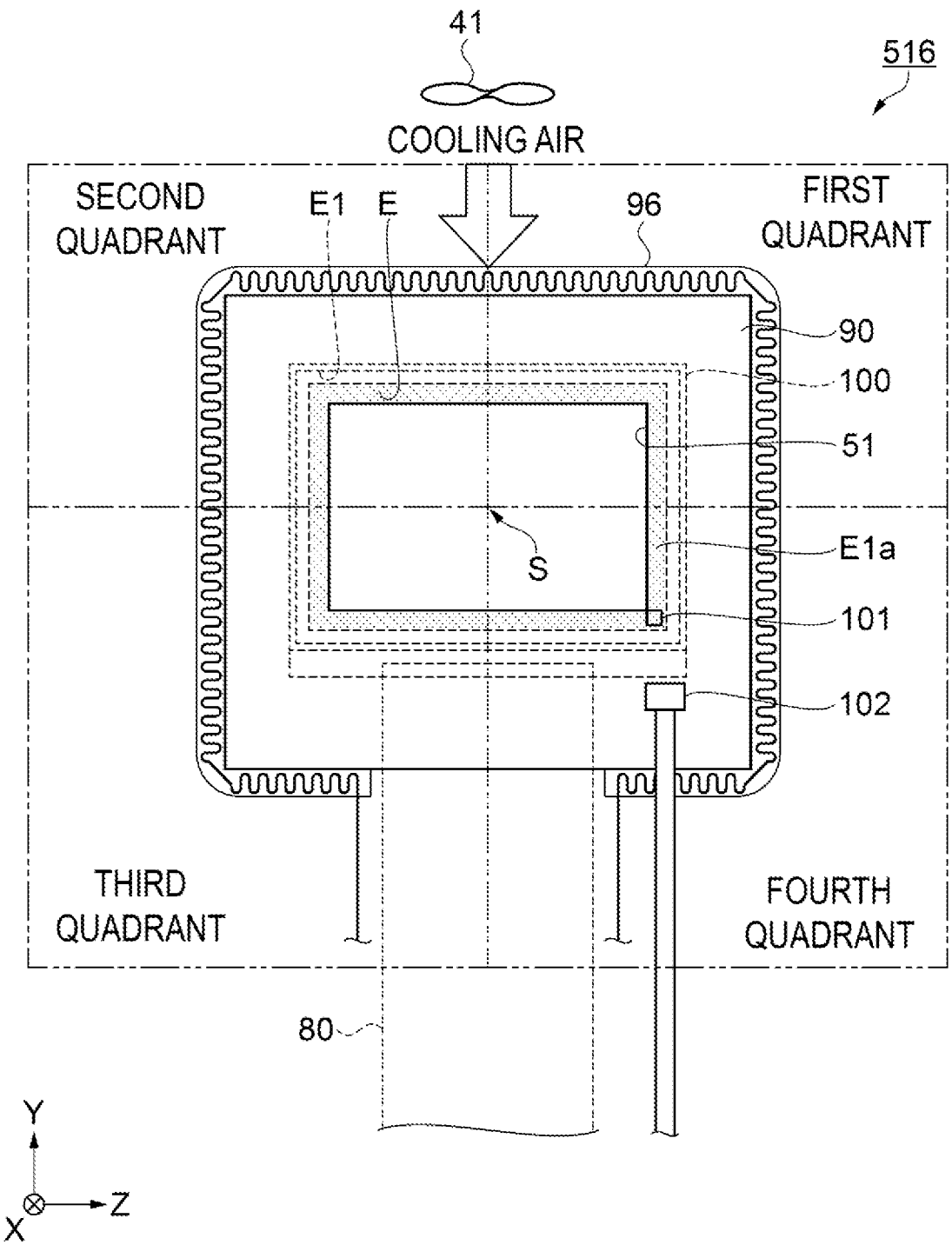
FIG. 27 is a plan view illustrating a configuration of a liquid crystal device of a modified example.
Figure 28:
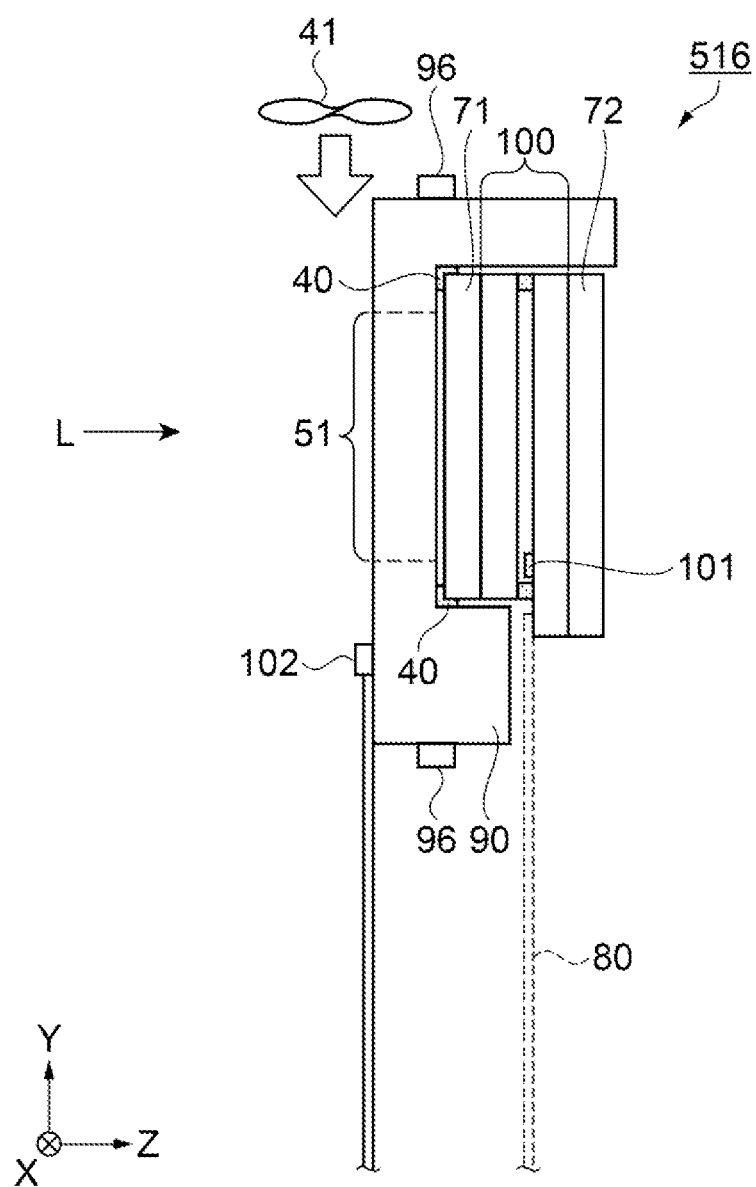
FIG. 28 is a cross-sectional view illustrating a configuration of the liquid crystal device illustrated in FIG. 27.

FIG. 27 is a plan view illustrating a configuration of a liquid crystal device 516, which is a modified example of the liquid crystal device 503 according to the fourth embodiment. FIG. 28 is a cross-sectional view illustrating the configuration of the liquid crystal device 516. In comparison to the configuration of the liquid crystal device 503 according to the fourth embodiment, a portion of the liquid crystal device 516 differs in that the heater 96 is disposed on side surfaces of the holder 90. The heater 96 is, for example, a film heater. The second temperature detecting element 102 is disposed on the upper surface of the holder 90 in the fourth quadrant, which is the same quadrant as the first temperature detecting element 101.

According to this configuration, the heater 96 is not present between the first temperature detecting element 101 and the second temperature detecting element 102, and thus no heat generation source is present between the first temperature detecting element 101 and the second temperature detecting element 102. As long as the temperature T1 of the first temperature detecting element 101 and the temperature Th of the second temperature detecting element 102 can be monitored, the temperature T2 of the display central portion S can be estimated using Expression (5). Further, in comparison to the liquid crystal device 503 according to the fourth embodiment, the temperature of the holder 90 can be detected without separately forming the mounting hole 90a in which the second temperature detecting element 102 is mounted.

Further, the first temperature detecting element 101 and the second temperature detecting element 102 are not limited to being disposed so as to be in the same quadrant, and may be disposed in the following ways. When the temperature of the display central portion S of the liquid crystal panel 100 is T(X2), the temperature of the first temperature detecting element 101 is T(X1), the temperature of the second temperature detecting element 102 is Th, and the coefficient is K, in Expression (5), the first temperature detecting element 101 and the second temperature detecting element 102 may be disposed such that K is equal to or less than 3. In the example, the temperature estimation of the display central portion S is mainly described, but the present disclosure is not limited thereto. Since Expression (5) is established as long as the first temperature detecting element 101 and the second temperature detecting element 102 are under the influence of the same heat flow and the heat generation source between the first temperature detecting element 101 and the second temperature detecting element 102 is at a level that can be ignored, the temperature of a region other than the display central portion S may be estimated. Alternatively, the temperature estimation may be performed by individually determining the coefficients K for a plurality of regions in the display region E. Further, the quadrant in which the first temperature detecting element 101 and the second temperature detecting element 102 are disposed is not limited to one. In the example, the first temperature detecting element 101 and the second temperature detecting element 102 are disposed as one set in one of the quadrants, but the first temperature detecting element 101 and the second temperature detecting element 102 may be disposed in each of the quadrants. If this configuration is adopted, the temperature distribution of the whole of the display region E can be estimated using four of the first temperature detecting elements 101 and four of the second temperature detecting elements 102. Furthermore, in the example, an example is described in which the cooling air from the cooling fan 41 is blown from the upper side of the liquid crystal device 500 in plan view, but the present disclosure is not limited thereto, and can be applied to a case in which the cooling air is blown from another direction. Even if the cooling air is blown from a normal line direction of a flat surface of the liquid crystal device 500, Expression (5) is established as long as the first temperature detecting element 101 and the second temperature detecting element 102 are under the influence of the same heat flow, and thus, the temperature of the display region can be estimated.

Further, the present disclosure is not limited to being applied to the liquid crystal devices 500 to 516 as described above as the electro-optical device, and the electro-optical device may be a direct-view liquid crystal device provided with a backlight, for example. The liquid crystal device is also not limited to being the transmission type. Further, as long as the display region can be considered to have a uniform distribution of heat generation, the present disclosure may also be applied to an organic EL device, a plasma display, electronic paper (EPD), or the like.

Note that, in addition to the projector 1000, various types of electronic apparatus can be used as the electronic apparatus on which the liquid crystal device 500 is mounted, such as a head-up display (HUD), a head-mounted display (HMD), a smartphone, an electrical view finder (EVF), a mobile mini projector, an electronic book, a mobile phone, a mobile computer, a digital camera, a digital video camera, a display, an in-vehicle device, an audio apparatus, a light exposure device, a lighting apparatus, and the like.

What is claimed is:

1. An electro-optical device comprising:
an electro-optical panel including a display region;
a holder configured to hold the electro-optical panel;
a wiring substrate electrically coupled to the electro-optical panel; and
a panel driving IC disposed at the wiring substrate;
a first temperature detecting element disposed at the electro-optical panel; and
a second temperature detecting element disposed at the holder, wherein
when four quadrants are defined by an X axis line passing through a center of the display region and a Y axis line passing through the center of the display region and orthogonal to the X axis line, the first temperature detecting element and the second temperature detecting element are disposed at the same quadrant,
the panel driving IC is disposed at a position overlapping the holder in plan view, and
the second temperature detecting element is disposed on the first temperature detecting element side of the panel driving IC in plan view.

2. The electro-optical device according to claim 1, wherein
the first temperature detecting element detects a temperature of the electro-optical panel, and
the second temperature detecting element detects a temperature of the holder.

3. The electro-optical device according to claim 1, wherein
the electro-optical panel is disposed in a flow of a refrigerant for cooling the electro-optical panel, and
the first temperature detecting element is disposed downstream in the flow of the refrigerant.

4. The electro-optical device according to claim 1, wherein
the first temperature detecting element is disposed at a position not overlapping the display region in plan view.

5. The electro-optical device according to claim 1, wherein
the holder has an opening between the panel driving IC and the second temperature detecting element.

6. The electro-optical device according to claim 1, wherein
the first temperature detecting element and the second temperature detecting element are disposed at a side of the electro-optical panel on an opposite side from a side coupled to the panel driving IC.

7. The electro-optical device according to claim 1, comprising
a heating unit configured to heat the electro-optical panel, wherein
the second temperature detecting element is disposed at the holder between the heating device and the first temperature detecting element.

8. An electronic apparatus comprising:
the electro-optical device according to claim 1.

9. An electro-optical device comprising:
an electro-optical panel;
a holder configured to hold the electro-optical panel;
a first temperature detecting element configured to detect a temperature of the electro-optical panel; and
a second temperature detecting element configured to detect a temperature of the holder, wherein
the first temperature detecting element is disposed at the electro-optical panel,
the second temperature detecting element is disposed at the holder, and
the first temperature detecting element and the second temperature detecting element are disposed to cause a coefficient K to be no more than 3 in a following expression:

$$T(X2)=K(T(X1)-Th)+Th$$

where a temperature of a central portion of a display region of the electro-optical panel is $T(X2)$, a temperature of the first temperature detecting element is $T(X1)$, a temperature of the second temperature detecting element is $Th$, and the coefficient is $K$.

* * * * *